(12) United States Patent
Stuntebeck

(10) Patent No.: US 9,391,995 B2
(45) Date of Patent: Jul. 12, 2016

(54) REMOTE PROCESSING OF MOBILE APPLICATIONS

(71) Applicant: AirWatch LLC, Atlanta, GA (US)

(72) Inventor: Erich Peter Stuntebeck, Marietta, GA (US)

(73) Assignee: AirWatch LLC, Atlanta, GA (US)

( * ) Notice: Subject to any disclaimer, the term of this patent is extended or adjusted under 35 U.S.C. 154(b) by 102 days.

(21) Appl. No.: 14/502,921

(22) Filed: Sep. 30, 2014

(65) Prior Publication Data

US 2016/0094560 A1   Mar. 31, 2016

(51) Int. Cl.
*H04L 29/06* (2006.01)
*H04L 29/08* (2006.01)
*G06F 3/0484* (2013.01)

(52) U.S. Cl.
CPC ............ *H04L 63/102* (2013.01); *G06F 3/0484* (2013.01); *H04L 63/08* (2013.01); *H04L 63/20* (2013.01); *H04L 67/125* (2013.01)

(58) Field of Classification Search
CPC ......... H04L 63/10; H04L 63/20; H04L 67/42; H04L 63/102
See application file for complete search history.

(56) References Cited

U.S. PATENT DOCUMENTS

2005/0262549 A1* 11/2005 Ritt .......................... G06F 21/33
726/1
2011/0265188 A1* 10/2011 Ramaswamy ........ G06F 9/4443
726/28

* cited by examiner

*Primary Examiner* — Izunna Okeke

(57) ABSTRACT

In an example implementation of the disclosed technology, a method includes accessing, by a management agent associated with a client device, a profile associated with a requested resource, wherein the profile comprises at least one profile criterion. The method also includes evaluating the profile criterion based, at least in part, on status information associated with the client device to determine any processing restrictions associated with the requested resource. The method also includes, responsive to receiving an indication that the resource is subject to a server-device processing restriction, requesting access to the resource from a remote server and receiving an instance of a user interface for interacting with the resource.

20 Claims, 6 Drawing Sheets

REMOTE PROCESSING OF MOBILE APPLICATIONS

BACKGROUND

Employee-utilized client devices (e.g., smartphones, tablets, laptops) provide significant productivity advantages for enterprises. As the cost of client devices continues to decrease and the computing power of client devices continues to increase, it has become more feasible for employees to utilize client devices to complete most (if not all) of their work duties. Consequently, information technology departments ("IT Departments") struggle with striking a balance between providing employees with access to enterprise resources (i.e., data) and ensuring the security and integrity of enterprise resources. A common solution for such problem is having the IT Department remotely manage client devices with access to enterprise data. But, IT Departments continue to be challenged in ensuring that employees have access, via their client device, to certain resources, and particularly enterprise resources, while maintaining the security of those resources.

BRIEF DESCRIPTION OF THE DRAWINGS

Many aspects of the present disclosure can be better understood with reference to the following diagrams. The drawings are not necessarily to scale. Instead, emphasis is placed upon clearly illustrating particular features of the disclosure. Moreover, in the drawings, like reference numerals designate corresponding parts throughout the several views. In the drawings.

DETAILED DESCRIPTION

Figure 1:
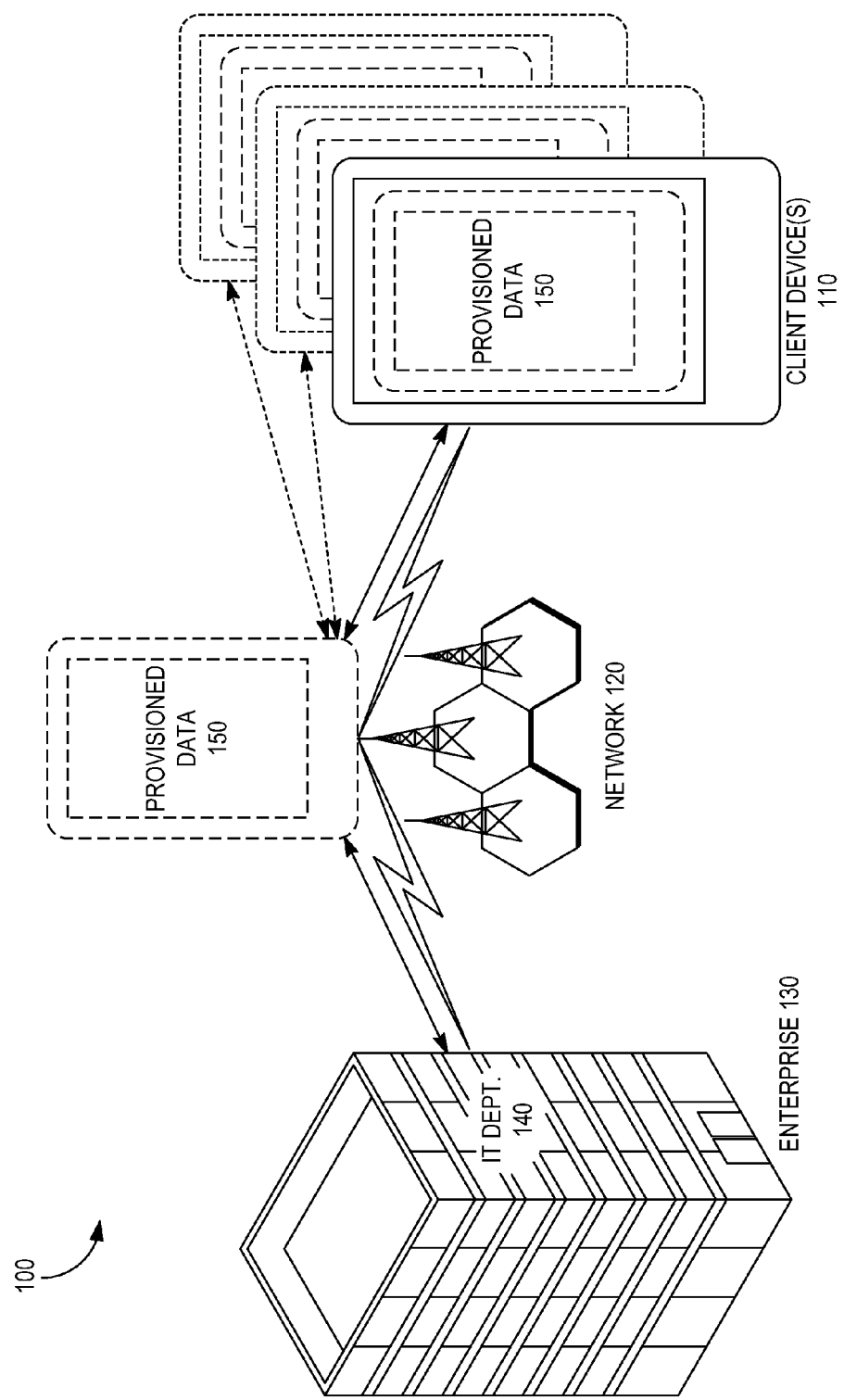
FIG. 1 is an illustration of an operating environment in which embodiments may be practiced.

Client device users are capable of accessing many different types of resources via their client device. For example, client device users may access various apps, which may include email applications, calendars, games, weather applications, web browsers, and other client device-enabled applications. Further, client device users may access various content, which may include documents, spreadsheets and many other such client-device-accessible resources. In particular, client device users may utilize their client device to access enterprise-related resources, which may include enterprise-specific applications and content.

In an enterprise context, it is often preferable to provide added security to client-device accessible resources. For example, enterprise resources may contain sensitive information such as contact lists, customer or client correspondence, financial information, intellectual property, and various other information relating to the enterprise. In certain scenarios, client devices may not afford sufficient protection to resources that contain (or provide access to) certain sensitive information. Accordingly, enterprise administrators may configure profiles that constrain the manner in which a client device can access a resource. For example, a profile may specify that processing of a resource must occur remotely at, for example, a secure remote server. Additionally, a profile may specify that processing of certain aspects of the resource must occur remotely while processing of other aspects can occur at the client device.

A profile may also be configured to constrain the manner in which a user of a client device may engage a resource depending on status information associated with the client device (i.e., the client device requesting access to the resource). Accordingly, in certain situations, a resource may be constrained such that processing of the resource must occur at a remote server. In other situations, however, the resource may be constrained such that only certain aspects have to be processed at a remote server, while other aspects can be processed locally at the requesting client device.

Because aspects of a resource may be processed remotely while others are processed at the client it device, it may be necessary to merge a user interface associated with the client-device-processed aspects of the resource with a user interface associated with the server-processed aspects of the resource. In certain implementations, aspects of the present disclosure may generate and fuse or aggregate this user interface and present the fused or aggregated user interface to the user such that the user is unaware that aspects of the resource are processed locally while others are processed remotely. Alternatively, in certain implementations, aspects of the present disclosure may present the fused or aggregated user interface to the user with a notification that certain aspects have been processed remotely while other aspects have been processed locally.

The present invention now will be described more fully hereinafter with reference to the accompanying drawings, in which some, but not all embodiments of the inventions are shown. Wherever possible, the same reference numbers are used in the drawings and the following description to refer to the same or similar elements. While certain embodiments of the disclosure may be described, modifications, adaptations, and other implementations are possible. For example, substitutions, additions, subtractions and/or modifications may be made to the elements illustrated in the drawings and the methods described herein may be modified by substituting, reordering, or adding stages to the disclosed methods. Indeed, the present invention may be embodied in many different forms and should not be construed as limited to the embodiments set forth herein. Accordingly, the following detailed description does not limit the disclosure. Instead, the proper scope of the disclosure is defined by the appended claims.

The present application is generally directed to electronic device security and, more particularly, to systems, methods, apparatuses, and computer program products for providing management of restricted resources, including restricted applications and restricted content. As used herein, a restricted resource may refer to any resource that is constrained by a profile (i.e., a collection of criteria which may include credentials, configurations, and rules), which may be designated by an administrator of the client device via a management service. For example, a profile may constrain use of, input to, output from, and/or functionality of particular resources (e.g., restricted application or restricted content) to which a particular designation or processing restriction has been given (e.g., server-only, server-device, etc.).

As noted, as used herein, restricted resources (e.g., restricted applications and/or restricted content) may refer to resources that are constrained by a rule set (also referred to herein as a profile). A rule set may, for instance, constrain a user's access to restricted resources or particular aspects of restricted resources. For example, certain enterprise-related resources (e.g., documents, contact lists, spreadsheets, emails, financial information, intellectual property, applications, etc., associated with an enterprise) may be particularly sensitive and warrant increased protection or security. Accordingly, an administrator may configure a rule set associated with the restricted resources that specifies that at least one feature or aspect of the resource must be processed outside of the client device (e.g., on a remote server or processor). As referred to herein, restricted resources may refer to restricted content and/or restricted applications, which may include sensitive enterprise information. As discussed, in one embodiment, an administrator may configure a rule set via a device management dashboard provided by a management service.

Example embodiments of such systems, methods, apparatuses, and computer program products may be configured to identify requests to engage a restricted resource and re-direct such requests. More particularly, requests to engage a resource on client devices may be analyzed to determine whether the resource is restricted (i.e., whether a profile associated with the resource indicates whether there are any processing restrictions associated with the resource). In an instance in which it is determined that the request is to access or engage a restricted resource, a management agent of the client device may attempt to coordinate with an authorized application capable of performing the request (e.g., a remote server).

For example, in an instance in which it is determined that the request is to engage a restricted resource that is constrained to server execution only (e.g., a profile associated with the resource indicates the resource is designated as "server only"), a client device new request may request access to the resource from a remote server. Alternatively, in an instance in which it is determined that the request is to engage a restricted resource in which the processing restriction indicates that certain aspects of the resource can be engaged on the client device while other aspects are constrained to server execution only (e.g., a profile associated with the resource indicates the resource is designated as "server-device"), a client device may initiate the generation of an aggregate user interface (UI) configured to present to the user an aggregate UI that combines device-side aspects of the resource with server-side aspects of the resource. These operations may be useful to constrain particular aspects of particular resources, as necessary.

In one embodiment, actions associated with a resource may also be restricted. Examples of actions that may be considered restricted actions may include, but are not limited to, sending email, posting messages to social media services, and/or accessing resources via remote resource services. Within the context of an enterprise, restricted actions may include actions that may implicate the enterprise; for instance, restricted actions may include, but are not limited to, actions that utilize keywords related to the enterprise, contacts of the enterprise, servers associated with the enterprise, and/or resources constituting the intellectual property of the enterprise.

As a practical example within the context of an enterprise, an IT Department of an enterprise may utilize a web-based administrative portal provided by a management service to designate particular resources as restricted (e.g., restricted applications and/or restricted content). For instance, the IT Department may designate sending an email to an enterprise contact as a restricted action or may designate particular resources (e.g., applications and/or content) as restricted resources (e.g., restricted applications and/or restricted content). For example, the IT Department may designate applications that utilize content that comprises information associated with the enterprise (e.g., information that utilizes keywords associated with the enterprise, information relating to contacts and/or personnel of the enterprise, information relating to the enterprise's intellectual property) as restricted (i.e., the IT Department may designate the resources with a processing restriction). Additionally, the IT Department may designate such resources with a processing restriction that indicates the resources are "server-only," in which case they cannot be engaged on a client device, or "server-device," in which case aspects of the resource cannot be engaged on a client device.

More specifically, the operations described herein may first determine whether a request relates to a restricted resource as designated by an IT Department. If the request does relate to a restricted resource, operations described herein may determine a remediation measure. Accordingly, as will be appreciated, the operations described herein provide a means for ensuring that actions relating to restricted resources (e.g., restricted applications and/or restricted content, which may include sensitive enterprise information) are handled safely, which may be especially useful in the context of an enterprise.

In another example within the context of an enterprise, an IT Department of an enterprise may utilize a web-based administrative portal provided by a management service to configure a profile associated with a resource such that the profile includes one or more profile criteria. For example, a profile may include profile criteria that must be satisfied for a client device to be able to access a requested resource. In one example, the profile may apply a processing restriction to the requested resource if the client device requesting access to the resource fails to satisfy certain profile criteria. In this way, the processing restriction relating to a resource may be dynamic as it is based on whether the client device requesting access to the resource satisfies the profile criteria. In an example embodiment, status information that describes the resource-requesting client device may be evaluated to determine whether the profile criteria are satisfied. So, in an example embodiment, evaluating profile criteria may be based, at least in part, on status information describing the client device.

In an example embodiment, profile criteria may require a client device requesting access to the resource to enable one or more configurations, to utilize one or more credentials, and/or to satisfy one or more compliance rules. Further, in an example embodiment, profile criteria may relate to state details of the client device (e.g., whether the client device is in a factory default state, whether the client device is in a jail-broken state, whether the client device is connected to a secure network). Likewise, in an example embodiment, profile criteria may relate to technological characteristics of the client device (e.g., hardware or software features enabled on the client device, resources accessible to and/or stored by the client device). Additionally, in example embodiments, profile criteria may relate to contextual characteristics of the client device (e.g., geographic location of the client device, time of operation of the client device).

Accordingly, in an example embodiment, the operations described herein may evaluate profile criteria to determine whether a particular resource is subject to a processing restriction. Put differently, a profile may specify that a particular resource is subject to a processing restriction in certain circumstances and is not subject to a processing restriction in others. Accordingly, to determine whether a resource is subject to a processing restriction (as designated by a profile and/or profile criteria), the operations described herein may first evaluate status information relating to the client device making the request, and, based on the evaluation, determine whether the requested resource is subject to a processing restriction.

Example implementations of the disclosed technology will now be described with reference to the accompanying figures. Elements of the figures are depicted and described in the singular, although it will be understood that a plurality of each element may be employed in the arrangements as described herein; for ease of understanding, the elements of the include designations that the element may be either singular or plural (e.g., client device(s), management server(s), and the like).

FIG. 1 is an illustration of an example operating environment 100 in which embodiments consistent with this disclosure may be practiced. Operating environment 100 may comprise a client device 110, a plurality of provisioned data 150, a network 120, an enterprise 130, and an IT Department 140 (i.e., Information Technology Department) of the enterprise 130. In certain embodiments, the provisioned data 150 may include one or more of at least one management record 230 (depicted in FIG. 2), at least one procedure call 240 (depicted in FIG. 2), and at least one resource 250 (depicted in FIG. 2), as described herein with respect to FIG. 2.

As depicted, the IT Department 140 of the enterprise 130 may provide the capability to "manage" the client device 110 through the network 120. In certain embodiments, management of the client device 110 may include designating particular provisioned data 150 for transmission to the client device 110. In some embodiments, management of the client device 110 may include provisioning (i.e., transmitting) particular provisioned data 150 to the client device 110. In any case, depending on the capabilities of a particular client device 110 (e.g., limitations of the operating system 330 of the particular client device 110), the client device 110 may be managed by "pushing" certain provisioned data 150 to the client device 110 or by instructing the client device 110 to "pull" certain provisioned data 150 from the enterprise 130, as described herein.

In some embodiments, an IT Department 140 may manage the client device 110 "over-the-air" via the network 120. The network 120 may be and/or provide access to a wired and/or wireless network 120, such as a wireless local area network (WLAN), a wireless wide area network (WWAN), an Ethernet network, or a fiber-optic network. The network 120 may further be and/or provide access to the Internet and/or an intranet, extranet, microwave network, satellite communications network, cellular network (e.g., LTE, LTE-A, GSM, CDMA, and/or the like), infrared communication network, global area network, and/or combinations thereof. In any case, the IT Department 140 and the client device 110 may connect with the network 120 (and thereby be connected to one another) via wired means (e.g., Ethernet, USB, and/or the like) or via wireless means (e.g., Wi-Fi, BLUETOOTH, NFC, and/or the like).

Figure 2:
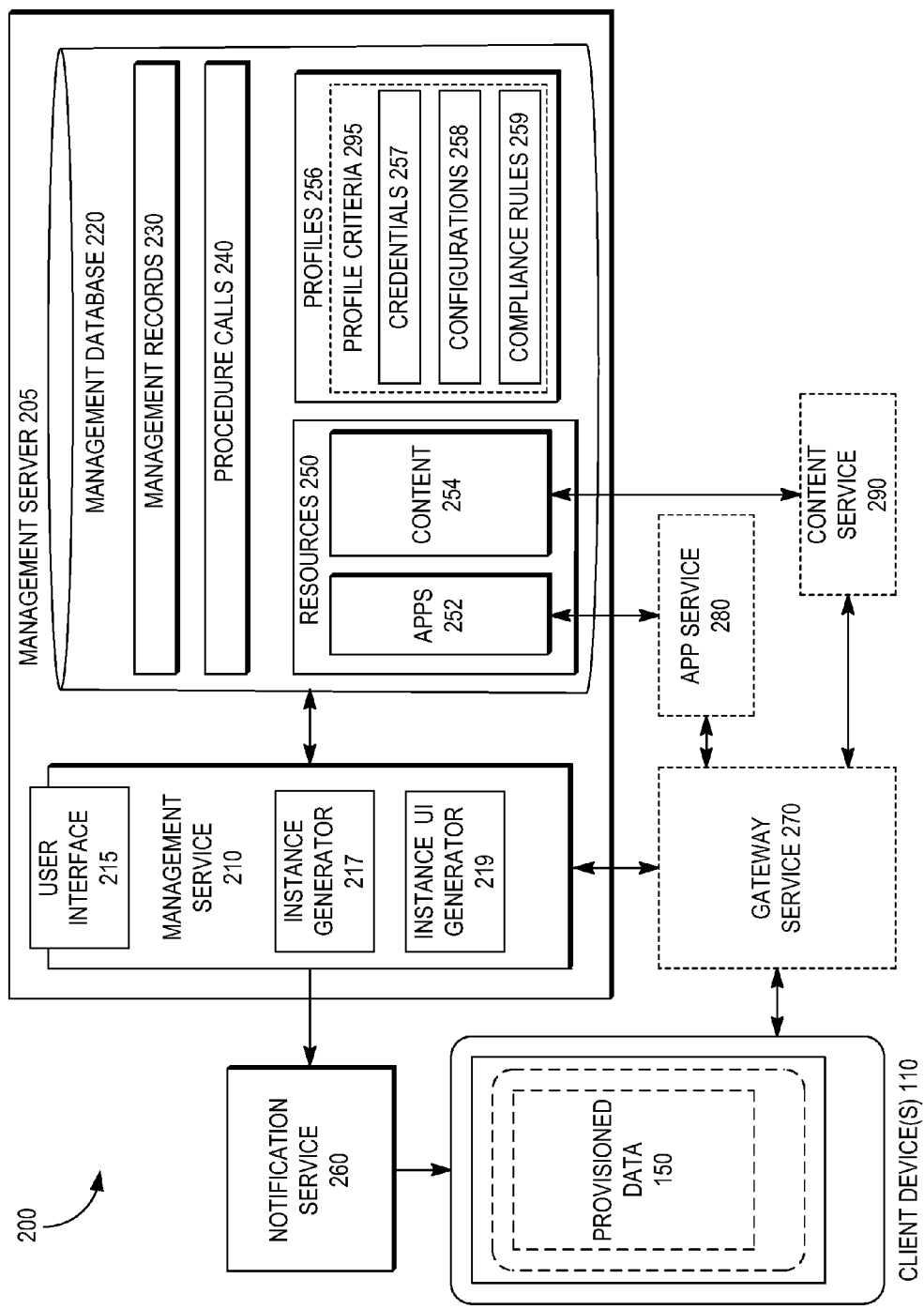
FIGS. 2 and 3 are schematic representations of an example management system that may be configured according to embodiments of the present invention.

FIG. 2 illustrates a schematic representation of an example management system 200 which may be configured according to example embodiments of the present invention. While FIG. 2 illustrates one example configuration of the management system 200, numerous other configurations may be used according to some example embodiments. With respect to FIG. 2, the management system 200 may comprise a client device 110, a management server 205, a notification service 260, a gateway service 270, an app service 280, and a content service 290. In certain embodiments, the management system 200 may be particularly useful for providing management of at least one client device 110 with access to a computing environment of the enterprise 130.

Embodiments of the Management Server

In certain embodiments, the management server 205 may be any type of network-accessible electronic device or system that includes a service, such as the depicted management service 210, and a storage medium, such as the depicted management database 220. In some embodiments, the management server 205 may comprise a cloud server-based solution, a physical server-based solution, and/or combinations thereof configured to provide device, content, application, network connection, and/or expense management capability. For purposes of convenience, the management server 205 is referred to herein in the singular, although it will be understood that a plurality of management servers may be employed in the arrangements as described herein; for instance, multiple management servers 205 may operate on the same server computer.

In certain embodiments, the management service 210 may be an application installed on the management server 205. In some embodiments, the management service 210 may be configured to access data stored within the management database 220 during performance of its operations. The management service 210 may be operable to provide management capabilities with respect to the client device 110. For example, in one embodiment, the management service 210 may include at least one of AirWatch™, VMware Horizon™, Apple OSX Server™, or Google Mobile Management™.

In certain embodiments, the management service 210 may be configured to communicate with at least one client device 110 (and/or the gateway service 270, the app service 280, and/or the content service 290) over the network 120 to provide management capabilities. For instance, the IT Department 140 of the enterprise 130 may "manage" the client device 110 via the management service 210 by performing at least one management operation with respect to the client device 110. For instance, the management service 210 may be configured to transmit at least one procedure call 240 to the client device 110, as described herein. Additionally, for example, the management service 210 may be configured to provision at least one resource 250 to the client device 110, as described herein.

While the management service 210 is described as operable to manage the client device 110 (i.e., a single client device 110) with respect to FIG. 2, it is to be understood that the management service 210 may be operable to manage a plurality of client devices 110. In one embodiment, the management service 210 may manage a group of client devices 110 by performing management operations with respect to the group of client devices 110. For instance, the management service 210 may store designations of at least one "management group" (i.e., group of client devices 110) in the management database 220 of the management server 205, which may be utilized by the management service 210 in an instance in which a management operation is to be performed by the management service 210. In one embodiment, the management group may be a static management group (i.e., a "location group" or "user group") such that client devices 110 belonging to the management group are substantially fixed; that is, the management group may designate at least one client device 110 (or user whose respective client device 110) will generally remain a member of the management group, irrespective of any context or circumstances, until an authorized administrator changes the group. In another embodiment, the management group may be a dynamic management group (i.e., a "smart group") such that client devices 110 belonging to the management group are based at least in part on at least one group inclusion criteria; that is, the management group may designate at least one group inclusion criteria that is evaluated to determine which client devices 110 (or users) to include in the management group. For instance, the dynamic management group may determine its members in response to a threshold condition (e.g., an elapsed durational threshold), or may determine its members in an instance in which the dynamic management group is to be utilized (i.e., on-demand). In any case, the management service 210 may provide at least one dashboard through which an authorized user (i.e., an administrator) may designate at least one management group. In certain embodiments, the management service 210 may be configured to communicate with an instance generator 217 and an instance user interface (UI) generator 219. For example, upon determining a client device user is attempting to engage a resource 250 with a processing restriction designating the resource as server-only, the management service 210 may receive a request to access the resource 250. According to one embodiment, an instance generator 217 may be configured to generate an instance of the requested server-only resource 250. An instance UI generator 219 may then generate an instance of the UI associated with the server-only resource 250, which may be transmitted to the client device 110 such that the client device user can interact with the server-only resource 250.

In one embodiment, a profile 256 may designate a resource 250 as device-server, in which case certain aspects of the resource 250 can be engaged directly on the client device 110 while other aspects of the resource 250 must be executed at a remote server (e.g., management server 205). In such a scenario, the management service 210 may receive a request to access the server-side aspects of the resource 250 (i.e., the aspects of the resource 250 that must be executed at a remote server). For example, the management service 210 may receive a request to access aspects of the resource 250 that relate to an enterprise's financial information, client lists, sales strategies, or confidential information that have been designated as server-side. In response, an instance generator 217 may be configured to generate an instance of the requested resource 250 (or an instance of the server-side aspects of the resource 250), and an instance UI generator 219 may generate an instance of a UI for interacting with the server-side aspects of the restricted resource 250. As will be understood and appreciated, generating an instance of a resource 250 and an instance of a UI for engaging with a restricted resource 250 (or certain aspects of a restricted resource 250) allows an IT Department 140 to have control over what resources 250 actually reside on a client device 110. As will be further understood and appreciated, generating instance UIs for interacting with restricted resources 250 provides an optimization benefit to the client device 110. In particular, client device 110 processing power and battery power can be maximized. Further, client device 110 data usage flexibility can be maintained as an IT Department 140 can optimize the usage of system elements (i.e., client device 110 and management server 205) by balancing the loads of the system elements.

Embodiments of the Management Database

In certain embodiments, the management database 220 may store a variety of management data that may be provisioned to the client device 110 (i.e., provisioned data 150), which may include a management record 230, a procedure call 240, and/or a resource 250. Each of these possible components of the management database 220 will now be described in further detail.

In certain embodiments, a management record 230 may be a file that is specific to (i.e., associated with) the client device 110; that is, a particular management record 230 may include data relevant to a particular client device 110, such that the particular management record 230 is not applicable to other client devices 110. In some embodiments, the management record 230 may specify at least one management group to which the client device 110 associated with the management record 230 belongs. For instance, the management record 230 may specify that the client device 110 is a member of a "Global" static management group, a "United States" static management group, and a "Smartphone" static management group.

In certain embodiments, the management record 230 may include a plurality of information describing the management of the client device 110 by, for example, the management server 205. In one embodiment, the management record 230 may include a history of management operations taken by the management service 210 with respect to the client device 110. For instance, the management record 230 may specify when the client device 110 was initially enrolled with the management service 210, when the client device 110 has checked-in with the management service 210, when particular procedure calls 240, resources 250, and/or profiles 256 were provisioned to the client device 110 by the management service 210, and/or when the client device 110 was determined to be compliant and/or non-compliant with any profiles 256 and profile criteria 295 associated with the client device 110.

Additionally, in one embodiment, the management record 230 may specify at least one resource 250 that has been designated for provisioning to the client device 110 and/or that has been designated as required for the client device 110. For example, the management record 230 may specify apps 252 or content 254 that an administrator of the client device 110 has designated as required for the client device 110. Additionally, the management record 230 may specify profiles 256 that an administrator of the client device 110 has designated as required for the client device 110. Consequently, the management record 230 may provide a basis for identifying any profiles 256 to which the client device 110 must adhere for the client device 110 to be considered a compliant client device 110. More specifically, for example, the management record 230 may specify profile criteria 295 to which the client device must adhere as designated by a profile 256. For example, in one implementation, the management record 230 may specify profile criteria 295 that require that at least one credential 257 must be present on the client device 110, at least one configuration 258 must be enabled on the client device 110, and/or at least one compliance rule 259 must be satisfied by the client device 110 for the client device 110 to be considered compliant, as designated by a profile 256.

In certain embodiments, the management record 230 may include a plurality of status information 316 (depicted in FIG. 3), which may describe the state of the client device 110 itself, as described herein. For instance, the management record 230 may specify that the client device 110 is currently located in Atlanta, Ga. (e.g., based on its GPS coordinates), that the client device 110 is in a "jailbroken" state (i.e., its operating system 330 [depicted in FIG. 3] has been altered), and that the client device 110 is storing certain resources 250 that were provisioned to the client device 110 by the management service 210.

In some embodiments, the management service 210 may update the management record 230 on an ongoing basis. In one embodiment, the management service 210 may update the management record 230 upon the performance of management operations with respect to the client device 110 such that the management record 230 includes details regarding the management operations. For instance, the management service 210 may update the management record 230 upon provisioning a particular procedure call 240 to the client device 110, such that the management record 230 includes specifics regarding the procedure call 240 (e.g., operations called by the procedure call 240), date and time when the procedure call 240 was enforced upon the client device 110, at least one condition that triggered the enforcement of the procedure call 240 (e.g., the client device 110 did not satisfy a particular compliance rule 259), etc. In one embodiment, the management service 210 may update the management record 230 upon provisioning a particular resource 250 and/or profile 256 to the client device 110, such that the management record 230 includes specifics regarding the resource 250 (e.g., type of resource 250) or profile 256 (e.g., profile criteria 295 designated by the profile 256), date and time when the resource 250 and/or profile 256 was provisioned to the client device 110, an IT Department administrator that designated the resource 250 and/or profile 256 for provisioning to the client device 110, and/or the like. Furthermore, in one embodiment, the management service 210 may update the management record 230 upon receiving an indication (e.g., from the client device 110) that the status of the client device 110 has changed (i.e., the management service 210 may update the status information 316 of the management record 230 to reflect the current state of the client device 110).

As described herein, the management database 220 may also store at least one procedure call 240. In certain embodiments, the procedure call 240 may be configured to communicate with an application programming interface (API) of the client device 110, such that the client device 110 recognizes the procedure call 240 as a valid and authorized instruction to carry out certain procedures on the client device 110 (e.g., procedures specific to the procedure call 240, whose respective programming code may be stored in a platform library 320 [depicted in FIG. 3] of the client device 110). In some embodiments, the procedure call 240 may be enforced upon the client device 110 by the management service 210. More specifically, the management service 210 may transmit the procedure call 240 to the client device 110, which may be enforced on the client device 110 via the procedure call's 240 interaction with the platform library 320 of the client device 110 (e.g., through an API), as described herein.

In certain embodiments, the procedure call 240 may instruct the client device 110 to carry out at least one operation on the client device 110. In one embodiment, the procedure call 240 may instruct the client device 110 to erase certain data from the client device 110. For instance, the procedure call 240 may instruct the client device 110 to erase a portion of the data stored by the client device 110 (e.g., erase particular data specified by the procedure call 240, erase all data associated with the enterprise 130, erase all data associated with a particular user of the client device 110, erase all data stored on external media cards). Alternatively, for example, the procedure call 240 may instruct the client device 110 to erase all data stored by the client device 110 or return the client device 110 to a factory default state (i.e., a device wipe).

In one embodiment, the procedure call 240 may instruct the client device 110 to encrypt certain data stored by the client device 110. For example, the procedure call 240 may instruct the client device 110 to encrypt a portion of the data stored by the client device 110, such as data specific to the enterprise 130 or data personal to a user of the client device 110; alternatively, for instance, the procedure call 240 may instruct the client device 110 to encrypt all data stored by the client device 110. Additionally, the procedure call 240 may instruct the client device 110 to keep certain data stored by the client device 110 encrypted until a particular condition is satisfied. For instance, the procedure call 240 may instruct the client device 110 to keep the data stored on the client device 110 encrypted until an authorized password is provided.

In one embodiment, the procedure call 240 may instruct the client device 110 to lock (i.e., prevent access to) at least one function of the client device 110. For instance, the procedure call 240 may instruct the client device 110 to lock a display of the client device 110. Additionally, the procedure call 240 may instruct the client device 110 to maintain the functionality in a locked state until a certain condition is satisfied. For instance, the procedure call 240 may instruct the client device 110 to lock the display of the client device 110 until an authorized password is provided.

In one embodiment, the procedure call 240 may instruct the client device 110 to clear a current passcode configuration 258 of the client device 110. For example, the procedure call 240 may instruct the operating system 330 of the client device 110 to remove the current passcode configuration 258 of the client device 110 such that the client device 110 is no longer subject to the current passcode configuration 258. It is to be understood that this may be useful when a user forgets her passcode for the client device 110 (and is therefore locked out of her client device 110). Additionally, in one embodiment, the procedure call 240 may instruct the client device 110 to require that a user of the client device 110 supply a new passcode for the client device 110, which may be utilized by the client device 110 in creating a new passcode configuration 258 for the client device 110 that may be enforced upon the client device 110. It is to be understood that this may be useful when the passcode of the client device 110 needs to be reset, such as upon the expiration of a durational limitation of the passcode.

In one embodiment, the procedure call 240 may instruct the client device 110 to reboot the client device 110. For instance, the procedure call 240 may instruct the operating system 330 of the client device 110 to restart its operations after shutting down its operations. In one embodiment, the procedure call 240 may instruct particular apps 252 and/or services of the client device 110 to reboot. For example, the procedure call 240 may instruct the operating system 330 to kill the operations (i.e., force shut down) of apps 252 managed by the enterprise, and instruct the operating system 330 to launch the apps 252 managed by the enterprise shortly thereafter.

In some embodiments, the procedure call 240 may instruct the client device 110 to check in with the management service 210. For instance, the client device 110 may check in with the management service 210 by communicating with the management service 210 (e.g., transmitting data to and/or receiving data from the management service 210). More specifically, the procedure call 240 may instruct the client device 110 to provide particular status information to the management service 210 upon checking in with the management service 210 (i.e., the procedure call 240 may query the client device 110 for particular information). For example, the procedure call 240 may request that the client device 110 transmit at least a portion of the status information 316 describing the client device 110 (depicted in FIG. 3) to the management service 210 (e.g., the location and/or GPS coordinates of the client device 110, the local time where the client device 110 is currently located, one or more apps 252 installed on the client device 110, one or more networks 120 to which the client device 110 is connected, and one or more security features enabled on the client device 110).

In some embodiments, the procedure call 240 may instruct the client device 110 to initiate a synchronization of data with at least one remote service. For instance, the client device 110 may be instructed to synchronize data with the management service 210 such that the management service 210 has local access to at least a portion of the data stored by the client device 110 (e.g., a backup of the client device 110). Additionally, for example, the client device 110 may be instructed to synchronize data with the management service 210 such that the client device 110 has local access to at least a portion of the data stored by the management service 210 (e.g., a local downloaded copy of resources 250 stored by the management service 210).

In some embodiments, the procedure call 240 may instruct the client device 110 to enable a remote control function of the client device 110. For example, the procedure call 240 may provide an administrator with sufficient privileges (i.e., with respect to the client device 110) to remotely control the client device 110 (i.e., as if they were physically holding and using the client device 110), which may be facilitated via a remote control dashboard provided by the management service. In some embodiments, the remote control function of the client device 110 may enable a remote screen capture function (i.e., capability to capture the current view of the user interface of the client device 110), which may include saving a screen shot, printing the screen shot, emailing the screen shot, and transmitting the screen shot to the management service 210 (e.g., for presentation to an administrator of the client device 110 via a remote screen capture dashboard provided by the management service 210). In one embodiment, the remote control function of the client device 110 may enable a screen sharing function of the client device 110, which may provide the ability to remotely view the operations of the client device 110 (i.e., an administrator may view a stream of the user interface of the client device 110 as if she were physically holding and operating the client device 110, which may be particularly useful for diagnosis of any technical issues the client device 110 may be experiencing).

In some embodiments, the procedure call 240 may instruct the client device 110 to enable a file manager function of the client device 110. For instance, the file manager function of the client device 110 may provide the capability to remotely manage the file system of the client device 110 (i.e., as if the client device 110 were physically in hand). In one embodiment, the file manager function of the client device 110 may relay information to the management service 210, such that a file manager dashboard provided by the management service 210 displays the file system of the client device 110 to an administrator via which the administrator may enable, disable, and/or modify the file system of the client device 110. In one embodiment, the file manager function of the client device 110 may include at least one of the following capabilities (i.e., with respect to the client device 110): access the file system, access the registry manager, delete files, copy files (e.g., within the client device 110, via email, via SMS, via FTP), move files, create folders, copy folders, move folders, delete folders, rename files, rename folders, and install files (i.e., download). It is to be understood that the term "file" may be used to describe resources 250 (e.g., apps 252, content 254) and profiles 256, and thus the "file manager function" may refer to management of resources 250 and/or profiles 256 on the client device 110.

In some embodiments, the procedure call 240 may instruct the client device 110 to present a notification to the user of the client device 110. For instance, the client device 110 may present a notification to the user of the client device 110 that specifies that the client device 110 is not in a state of compliance with a particular compliance rule 259 (i.e., such that the user may make alterations to the client device 110 to place the client device 110 in a state of compliance with the compliance rule 259). The client device 110 may also present a notification that specifies that if the client device 110 is not placed in a state of compliance with the particular compliance rule 259 (e.g., by enabling, disabling, and/or modifying the client device 110) before a threshold duration expires, that a particular remedial action may be taken on the client device 110 (e.g., erasing data from the client device 110, preventing the client device 110 from accessing resources 250, locking particular functionality of the client device 110).

Additionally, as described herein, the management database 220 may further store at least one resource 250. In certain embodiments, resources 250 may include at least one app 252 and a plurality of content 254. Further, the management database 220 may store at least one profile 256. Additionally, the profile 256 may include profile criteria 295, which may comprise, for instance, at least one credential 257, at least one configuration 258, and/or at least one compliance rule 259.

Figure 3:
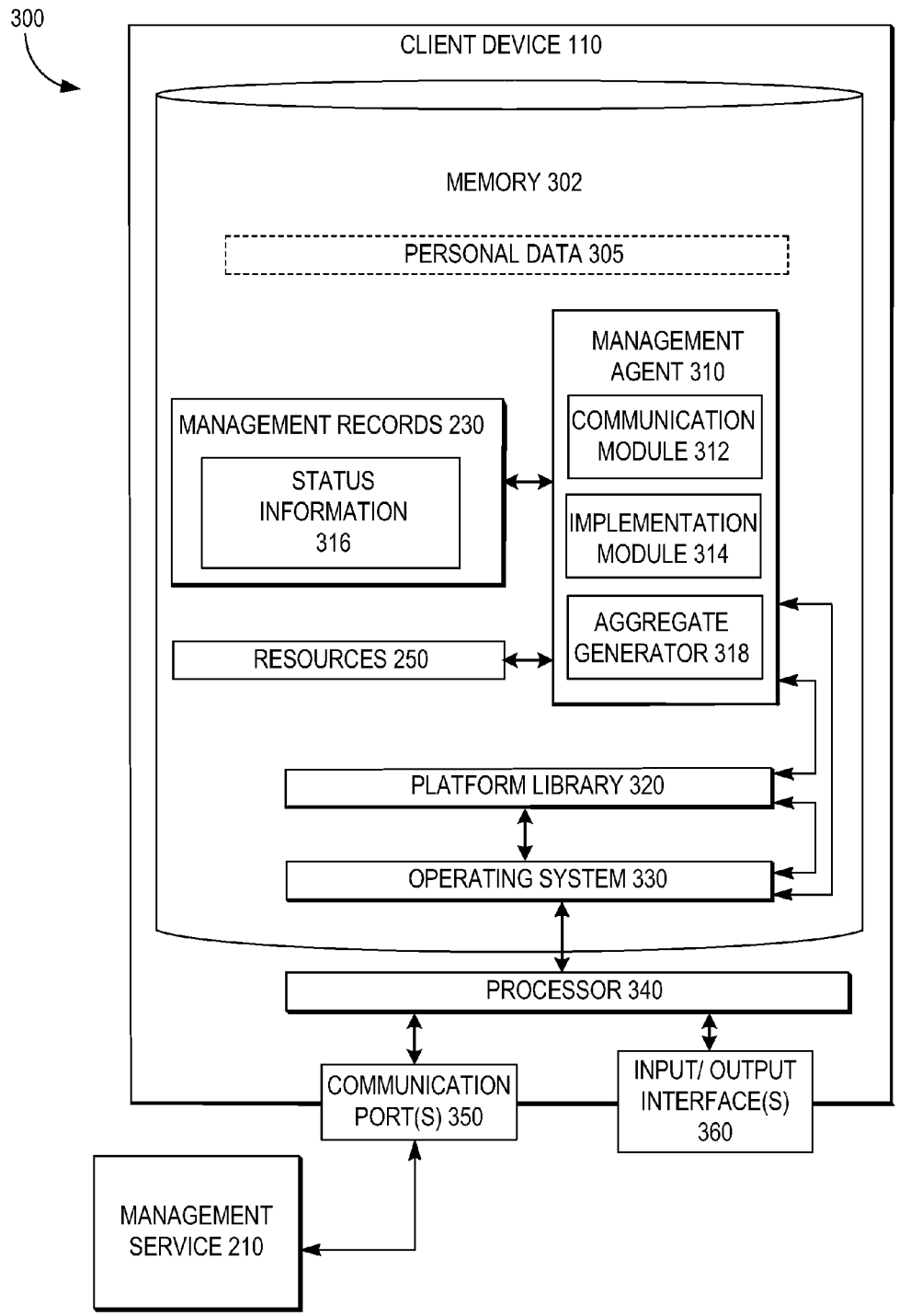

In certain embodiments, the resources 250 may further include at least one virtual image that includes the contents and the structure of a disk volume and/or an entire memory device, which may include at least one app 252 and a plurality of content 254, as well as at least one profile 256 (including profile criteria 295 such as at least one credential 257, at least one configuration 258, and at least one compliance rule 259). In the context of software virtualization, the virtual image may be initialized by client devices 110 (e.g., with the assistance of a hypervisor) to provide access to at least one additional computing environments on the client device 110 (i.e., an environment in addition to the native computing environment provided by operating system 330 of the client device 110 as depicted in FIG. 3). For instance, a client device 110 natively running the Google Android™ operating system 330 may additionally run an instance of the Apple™ iOS operating system 330 via a virtual image of the Apple iOS operating system 330 (i.e., when mounted via a hypervisor to provide an Apple iOS virtual machine). In the context of an enterprise 130, virtual images may be used to segregate a "work persona" from a "personal persona." In particular, a virtual image configured with to include a work persona may be kept "containerized" (i.e., segregated) from a personal persona (i.e., the native operating system 330 of the client devices 110) via a hypervisor, which may be instructed by the virtual image to prevent the operating system 330 of the client devices 110 from accessing data within the virtual image (i.e., the work persona data).

In some embodiments, apps 252 may include application software that causes particular client devices 110 to perform operations (with the assistance of a processor 340 and a memory 302 of a client device 110, as depicted in FIG. 3). For example, apps 252 may include mobile applications that are specifically designed for execution by handheld client devices 110 (e.g., smartphones and tablets). Additionally, apps 252 may include, for instance, standard applications that are specifically designed for execution by non-handheld client devices 110 (e.g., laptop and desktop computers). In any case, apps 252 may include standalone apps 252 (i.e., apps 252 that are not communicatively coupled to at least one management agent 310), and/or may include apps 252 that are communicatively coupled to at least one management agent 310 (e.g., apps 252 whose operations may be controlled and/or modified by the management agent 310). Additionally, apps 252 may include, for instance, a virtualization client that may provide access to at least one virtual machine that may be either locally and/or remotely executed.

In some embodiments, content 254 may include any electronic files (and the information contained therein) that provide intellectual value for a user. In the context of an enterprise 130, content 254 may include document files (e.g., Microsoft Word™, Apple Pages™, and/or Adobe PDF™ files), spreadsheet files (e.g., Microsoft Excel™, and/or Apple Numbers™ files), presentation files (e.g., Microsoft PowerPoint™, Apple Keynote™, and/or QuickTime™ files), database files (e.g., Microsoft Access™, and/or SQL™ files), and/or other electronic files that may assist and/or enable an employee of the enterprise 130 to perform the duties of her employment. In general, content 254 may include at least one of the following electronic file types: data, audio, video, two-dimensional images, three-dimensional images, raster images, vector images, page layouts, text, word processor files, spreadsheets, presentations, graphics, databases, executable files, CAD files, web files, plug-ins, fonts, system files, settings, encoded files, compressed files, disk images, source code, and/or backup files.

In certain embodiments, the at least one profile 256 may include any electronic files that modify (e.g., configure, constrain, restrict, add to, enhance) the manner in which particular client devices 110 may be operated. In some embodiments, the profile 256 may be configured as a resource 250, but the profile 256 may likewise be configured independently, as shown in FIG. 2. In one embodiment, the profile may be associated with particular functions of the client device 110 such that the profile 256 can modify the functions of the client device 110. For instance, a password protection function of the client device 110 may be modified by a password protection profile 256, a screen shot function of the client device 110 may be modified by a screen shot profile 256, etc. Moreover, in some embodiments, the profile 256 may be associated with particular resources 250 that may be provisioned to the client device 110 to modify the use of and/or access to the resources 250. In particular, the profile 256 may be associated with particular apps 252 that may be executed on the client device 110 to modify the execution of the particular apps 252 on the client device 110. For example, a native email app (e.g., Apple Mail™) may be modified by a native email app profile 256, a containerized email app (e.g., AirWatch Inbox™) may be modified by a containerized email app profile 256, etc. Similarly, the profile 256 may be associated with particular content 254 to modify the use of and/or access to the content 254. For instance, a document may be modified by a document content profile 256, a video may be modified by a video content profile 256, etc.

In certain embodiments, the profile 256 may specify certain processing restrictions or designations that are to be applied to particular resources 250 (e.g., apps 252 or content 254). For example, an IT Department 140 of an enterprise may determine that certain resources 250 should be restricted (i.e., the manner in which a user engages aspects of the resource's 250 functionalities should be constrained). Accordingly, in one embodiment, the IT Department 140 may configure profiles 256 associated with those resources 250 to designate the resources 250 as restricted resources (e.g., restricted apps 252 and/or restricted content 254). In one embodiment, the IT Department 140 may configure a profile 256 that designates a resource 250 as a "server-only" resource 250, in which case execution of the resource 250 must occur at a remote server (e.g., management server 205) instead of at the client device 150. In alternate embodiments, the IT Department 140 may configure a profile 256 that designates a resource 250 as a "device-server" resource. In such an instance, according to one embodiment, various aspects of the resource 250 can be executed at the client device 150, while other aspects are to be executed at the remote server.

In certain embodiments, an IT Department 140 may configure a profile 256 associated with a resource 250 such that the profile includes one or more profile criteria 295 that must be satisfied for a client device 110 to be able to access the resource 250 (or aspects of the resource 250). Put differently, a profile 256 may apply a processing restriction to a resource 250 if the client device 110 requesting access to the resource 250 does not satisfy certain profile criteria 295. In an example embodiment, status information 316 that describes the client device 110 may be evaluated to determine whether profile criteria 295 are satisfied. Accordingly, evaluating a profile criterion 295 to determine a processing restriction of a resource 250 may involve evaluating status information 316 describing the client device 110 requesting access to the resource 250, which may be included in a management record 230.

As described, status information 316 describing the client device 110 may indicate whether certain profile criteria 295 are satisfied. In an example embodiment, a profile criterion 295 may require a client device 110 requesting access to a resource 250 to enable certain configurations 258. Likewise, a profile criterion 295 may require a client device 110 requesting access to a resource 250 to utilize certain credentials 257 and/or satisfy certain compliance rules 259. As will be understood, profile criteria 295 may impose more than one requirement on a client device 110 (e.g., profile criteria 295 may require the client device 110 to utilize certain credentials 257 and have certain configurations 258 enabled). Accordingly, evaluating profile criteria 295 may be based, at least in part, on status information 316 describing the client device 110, which may indicate whether, for example, the client device 110 is utilizing the required credentials 257, has the required configurations 258 enabled, and/or satisfies certain compliance rules 259. Accordingly, in one embodiment, if it is determined, based on evaluation of the status information 316, that the profile criteria 295 are not satisfied, the profile 256 may apply a processing restriction to the requested resource 250.

In certain embodiments, profile criteria 295 may relate to the state of a client device 110 requesting access to a resource 250, and details relating to the state of the client device 110 (i.e., "state details") may be reflected in the status information 316 describing the client device 110, which may be included in a management record 230. In an example embodiment, state details may include whether the client device 110 is in a factory default state, whether the client device 110 is in a jailbroken state, and/or whether the client device is connected to a secure network. Additionally, in certain embodiments, profile criteria 295 may relate to technological characteristics of a client device 110 requesting access to a resource 250, and details relating to the technological characteristics of the client device 110 may be reflected in the status information 316 describing the client device 110. In example embodiments, technological characteristics may include hardware or software features enabled on the client device 110 and/or resources 250 accessible to and/or stored by the client device 110. Further, in certain embodiments, profile criteria 295 may relate to contextual characteristics of a client device 110 requesting access to a resource 250. Status information 316 describing the client device 110 may reflect contextual characteristics of the client device 110, which may include the geographic location of the client device 110 and/or time of operation of the client device 110).

In some embodiments, the profile 256 may be configured to be executable by particular operating systems 330. That is, in some instances, the profile 256 may need to be configured and/or coded such that it may be interpreted by the operating system 330 of the client device 110. Accordingly, for instance, a management service 210 may store multiple versions of the profile 256 (e.g., an Apple iOS version, a Google Android version, a Windows Phone™ version, and/or the like) such that a proper variation of the profile 256 may be provisioned to a given client device 110 based on the operating system 330 of such client device 110. Additionally, in some embodiments, one or more operating system-specific versions of the profile 256 may be provisioned to a given client device 110, such that a "personal persona" of the client device 110 (i.e., a native operating system 330) and a "work persona" of the client device 110 (i.e., a virtualized operating system 330) may be modified by the profile 256.

In some embodiments, the profile 256 may include standard text, and/or may include files encoded according to a particular feature of particular client devices 110 (i.e., via a proprietary encoding schema). In particular, standard text may include files written and/or encoded in ASCII (or another standard encoding schema) that may be interpreted and enforced by many (if not all) features of the client device 110. Alternatively, profiles 256 encoded via a proprietary encoding schema associated with a particular feature of the client device 110 may include files encoded with an encryption schema or encoded with a file extension type that is specific to the particular feature of the client device 110 (i.e., such that only the particular feature of the client device 110 can interpret and enforce the profile 256).

In any case, a profile 256 may include at least one credential 257, at least one configuration 258 and/or at least one compliance rule 259 that may modify at least one feature of the client device 110 (i.e., functions of the client device 110 and/or resources 250 accessible to such functions of the client device 110). As described herein, the profile 256 (and profile criteria 295, which may include any credentials 257, configurations 258, and/or compliance rules 259 included therein) may be designated by an administrator of the client device 110. In some embodiments, the profile 256 may be designated through an "administrative console" dashboard provided by the management service 210.

In certain embodiments, the at least one credential 257 may include authorization credentials, which may facilitate the client device 110 in accessing resources 250 (e.g., apps 252, content 254, profiles 256). In some embodiments, the credential 257 may include at least one of the following: client device 110 identifier(s) (e.g., name(s), UDID(s), phone number(s), IMEI/MEID number(s), serial number(s), IMSI number(s), model(s), version(s), manufacturer(s), Wi-Fi address(es), Wi-Fi MAC, current MCC, current MNC, SIM card number(s), SIM carrier network), user identifier(s) (e.g., username(s), user password(s), user personal identification number(s)), certificate(s), token(s), Smartcard(s), drivers license number(s), and social security number(s).

In certain embodiments, the at least one configuration 258 may include configuration files, which may specify settings for at least one function of the client device 110. In some embodiments, the configuration 258 may be interpreted and enforced on a particular feature of the client device 110 at startup and/or during run-time of the feature of the client device 110. For instance, a configuration 258 associated with apps 252 (i.e., generally) may be interpreted and enforced upon an execution of any app 252, and may be interpreted and enforced intermittently upon a time interval during execution of any app 252.

In some embodiments, the configuration 258 may specify settings for the client device 110 that enable and/or disable particular features of the client device 110. For instance, at least one of the following hardware features of the client device 110 may be enabled and/or disabled via a configuration 258: microphone, camera, screen capture, videoconferencing, Bluetooth, Bluetooth data transfer, Bluetooth discoverable mode, Bluetooth pairing, desktop computer connectivity via Bluetooth, outgoing phone calls via Bluetooth, tethering (e.g., Bluetooth, Wi-Fi, USB), USB port(s), USB debugging, USB media player, USB synchronization, near field communication (NFC)).

Additionally, for example, at least one of the following software features of the client device 110 may be enabled and/or disabled via the configuration 258: firewall, certificates (e.g., generally, installation of), Wi-Fi (e.g., generally, auto-join Wi-Fi networks 120, blacklist particular Wi-Fi networks 120, manual addition of Wi-Fi profiles 256, manual modifications to Wi-Fi profiles 256), VPN (i.e. Virtual Private Network), encryption (e.g., device-level encryption, app-level file container encryption), multiple-persona modes (e.g., personal persona, enterprise persona), auto-fill, cookies, JavaScript, pop-ups, native Internet browser app 252, native mail client app 252, fraud warnings, cloud backup (e.g., generally, for particular apps 252), administration (e.g., of client device 110, of user(s)), sharing amongst particular apps 252, voice/telephone usage (e.g., generally, over cellular networks, over VoIP, by particular apps 252, background usage, while roaming, limitations during a specified time duration), data usage (e.g., generally, over cellular networks, over Wi-Fi networks, by particular apps 252, background usage, while roaming, limitations during a specified time duration), factory reset, spoofed location data, over-the-air updates (e.g., operating system 330, firmware), personal assistant (e.g., generally, while client device 110 is locked), media card access (e.g., SD card), user-initiated settings changes, text and/or multi-media messaging (e.g., SMS, iMessage™), content service 290 access (e.g., iTunes, YouTube™, Game Center™, iBookstore™, Windows File Sharer™), voice-initiated phone call dialing (e.g., generally, while client device 110 is locked), incoming phone call alerts (e.g., audible ringer, vibration), multiplayer gaming (e.g., generally, adding contacts), and diagnostic data (e.g., collection of, transmission to manufacture(s)).

In some embodiments, the configuration 258 may specify settings for the client device 110 that modify (e.g., install, uninstall, update, adjust) particular features of the client device 110. For instance, at least one of the following features of the client device 110 may be modified by the configuration 258: APN settings (e.g., for GPRS carrier of client device 110), Wi-Fi (e.g., personal WEP, personal WPA/WPA2 personal, enterprise WEP, enterprise WPA/WPA2, minimum Wi-Fi certificate security level, minimum Wi-Fi security level, Wi-Fi proxy), VPN (e.g., L2TP, PPTP, IPSec, Cisco™, Juniper™, F5 SSL, Aruba™, SonicWALL Mobile Connect™, Websence™, custom VPN), certificates (e.g., mobile email, Microsoft Exchange ActiveSync™ (EAS), Wi-Fi, VPN, SSL, root access), encryption bit length (e.g., DES, AES), cellular calling settings, screen settings, display settings, permissible content 254 ratings (e.g., videos, music), Bluetooth configuration, lock screen wallpaper, home screen wallpaper, and firewall (e.g., general settings, IP reroute, redirect exceptions).

In some embodiments, the configuration 258 may specify settings for the client device 110 that enable, disable and/or modify password features of the client device 110. For example, at least one of the following password features of the client device 110 may be enabled, disabled and/or modified by the configuration 258: device-level password requirement, passcode timeout (i.e., lock functions of client device 110 after expiration of configured duration), password length requirement, simple password, alphanumeric password requirement, minimum device password complex characters, maximum failed password attempts, maximum inactivity time lock settings, password history (e.g., maintenance of, prevention of using previous passwords, minimum changed characters for new passwords), password expiration, invalid password grace period, purchase-related password requirements, single sign on (i.e., single password for more than one function of the client device 110).

In some embodiments, the configuration 258 may specify settings for the client device 110 that enable, disable and/or modify features of a personal information management (PIM) app 252 (e.g., EAS settings, email settings, calendar settings, contact settings). For instance, at least one of the following PIM features of the client device 110 may be enabled, disabled, and/or modified by the configuration 258: accounts (e.g., at least one EAS account), incoming email, outgoing email, email signature, sync (e.g., EAS), sync interval, sync schedule peak, sync schedule off-peak, SmartCard authentication, at least one EAS account, consumer email, HTML email, single sign on authentication, SSL, enable/disable TLS, S/MIME settings, require encrypted S/MIME messages, allow IRM, backing up data and/or settings, changing signature, copy/paste between email accounts, copy/paste data to phonebook, export to 3$^{rd}$ party widgets/apps 252, save attachments to media card (e.g., SD card), speech notifications, widgets, hide data from widget when client device 110 is locked, hide data on notification bar, IRM settings, prevent changing data or settings, require encryption, require media card encryption, attachments, require attachments stripped from email messages and transmitted to a containerized content access app 252 (e.g., AirWatch Secure Content Locker™), HTML email, plain text email, maximum attachment size, maximum calendar age, maximum email message age, maximum email message truncation size, require manual mail syncing when roaming, permit simple password, minimum password length, require password to access email app 252, POP/IMAP settings, date/time, CardDav integration for contacts, multiple contact address books, CalDav integration for calendar, subscriptions to ICS files for calendars, and multiple calendars.

In some embodiments, the configuration 258 may specify settings for the client device 110 that enable, disable and/or modify features of an Internet browsing app 252. For instance, at least one of the following browser features of the client device 110 may be enabled, disabled, and/or modified by the configuration 258: browser security restrictions, native browser, use of 3$^{rd}$ party browser, browser preference restrictions, whitelist (e.g., list of authorized websites), blacklist (e.g., list of unauthorized websites), kiosk mode (i.e., cannot navigate away from particular websites), website shortcuts in browser (i.e., web-clips), website shortcuts in home screen, web application creation, and bookmarks.

In some embodiments, the configuration 258 may specify settings for the client device 110 that enable, disable and/or modify features of a managed app 252 (e.g., apps 252 with management agents, application wrappers, or software development kits). For instance, at least one of the following managed app 252 features may be enabled, disabled, and/or modified by the configuration 258: data access (e.g., cellular access, Wi-Fi access, data in transit encryption), data sharing (e.g., generally, contact whitelist, contact blacklist, transmission protocol) data tunneling to remote services (e.g., via F5, via a proxy server that only allows access to data in instances in which the client device 110 is in a state of compliance with at least one compliance rule 259), certificates (e.g., certificate-based authentication, provisioning of certificates to apps 252), data-at-rest encryption, Data Loss Prevention (e.g., disable Bluetooth, disable camera, disable copy/paste), block access if compromised (e.g., jailbroken, root, or otherwise modified operating system 330 [depicted in FIG. 3] of the client device 110), integrated authentication (e.g., reuse of credentials from enrollment into management service 210, single sign on across apps 252), installation of apps 252 (e.g., generally, non-market apps 252, market apps 252, user-initiated, remotely-initiated, "push" to client device 110, "pull" to client device 110), over-the-air updates for apps 252, uninstallation of apps 252 (e.g., generally, user-initiated, remotely-initiated), silent modifications to apps 252 (e.g., installation, updates, uninstallation), whitelist (e.g., authorized apps 252, required apps 252), blacklist (e.g., unauthorized apps 252, prohibited apps 252), version management (e.g., authorized app 252 versions, unauthorized app 252 versions), history (i.e., usage of apps 252, usage of particular content via apps 252, crash logs, type of information captured by logs), required check-in interval (i.e., provide status of client device 110 to management service 210, provide history of app 252 usage to management service 210), roaming, printing (e.g., generally, particular printers), require that client device 110 is enrolled with management service 210, and custom app 252 branding (e.g., icons, logos, wallpaper).

In some embodiments, the configuration 258 may specify settings for the client device 110 that enable, disable and/or modify features of an app 252 configured to containerize and provide secure access to content 254 (e.g., AirWatch Secure Content Locker™). For instance, at least one of the following content 254 features may be enabled, disabled, and/or modified by the configuration 258: download (e.g., through cellular network 120, through Wi-Fi network 120, encryption of data during transit to client device 110, "push" to client device 110, "pull" to client device 110), accessibility (e.g., dates, time, geo-location of client device 110), expiration (e.g., dates, times, geo-location of client device 110, online revocation of content 254, offline revocation of content 254), online access (i.e., access while the client device 110 is in communication with the management service 210), offline access (i.e., access while the client device 110 is not in communication with the management service 210), content 254 categories, content 254 download queue with download prioritization and ordering, notify user(s) of content 254 availability (e.g., new content 254, updated content 254), show content 254 with available updates, external repository access (e.g., generally, Microsoft SharePoint, check-in/check-out to repository), encryption of data-at-rest (e.g., DES, AES), password requirement (e.g., generally, particular content 254, token-based authentication, certificate-based authentication, Smartcard-based authentication), copy content 254, paste content 254, sharing content 254 (e.g., generally, via email, via SMS/MMS), printing (e.g., generally, particular content 254), history of content 254 access (e.g., downloads, installations, usage, deletions), display contextual information (i.e., content 254 metadata), search available content 254, browse available content 254, annotations (e.g., generally, file types that may be annotated, add annotations, remove annotations, sharing of annotated content 254), supported file types (e.g., .DOC, .XLS, .PPT, .PDF, .MP4, .MOV, .MP3, .AAC, .ALAC, .PNG, .JPG), search within content 254, table of contents within content 254, hyperlinks within content 254, and view pages of content 254 as thumbnails.

In certain embodiments, the at least one compliance rule 259 may specify a policy to which particular apps 252 and/or content 254 must adhere, which may be embodied within a compliance rule file. In some embodiments, the management service 210 may provide a compliance rule management dashboard through which an administrator may designate the policies that should be effectuated by a given compliance rule 259. In some embodiments, the compliance rule 259 may include a pairing of at least one triggering condition and at least one remedial action, whose relationship is a "cause and effect" relationship such that upon the occurrence of a triggering condition a respective remedial action may be taken; that is, the triggering condition is the cause, and the remedial action is the effect of such cause.

In some embodiments, the compliance rule 259 may be enforced upon at least one feature of the client device 110 and/or at least one resource 250 accessible to the client device 110 at startup and/or during run-time of the feature of the client device 110 or access to the resource 250. For instance, a compliance rule 259 associated with particular content 254 (e.g., a PDF document) may be interpreted and enforced upon a request to access and/or otherwise use the content 254 (e.g., via a containerized content access app 252), and may be interpreted and enforced intermittently upon a time interval during access to and/or other usage of the content 254.

As described herein, the compliance rule 259 may include a triggering condition. In some embodiments, a triggering condition may include at least one of a request to perform at least one particular feature of the client device 110, a performance (e.g., partial, complete) of a particular feature of the client device 110, and/or a state of the client device 110. More specifically, the state of the client device 110 may include a plurality of characteristics describing the client device 110, such as at least one hardware feature enabled on the client device 110, at least one software feature enabled on the client device 110, at least one setting applied to the client device 110, at least one resource 250 accessible to and/or stored by the client device 110, at least one geographic location of operation of the client device 110, and/or at least one time of operation of the client device 110. Additionally, the state of the client devices 110 may include a finite state that describes particular client devices 110 at a particular moment in time, or a comprehensive state that describes particular client devices 110 over a particular period of time. Consequently, a triggering condition may be defined (e.g., by an administrator via the management service 210) as any undesirable state for the client device 110 to be in, which may include a plurality of criteria that may be evaluated over any configurable period of time.

Also as described herein, the compliance rule 259 may include a remedial action that may be paired with a triggering action. In certain embodiments, the remedial action may include at least one action that may be taken with respect to the client devices 110, which may be designated by an administrator of the client devices 110 (i.e., as a remedy to the triggering condition). In some embodiments, the remedial action may include the transmission to and/or enforcement of at least one procedure call 240 at the client device 110. In some embodiments, the remedial action may include a transmission of information (e.g., at least one notification) regarding the triggering condition being present on the client device 110. For instance, the notification may be transmitted to a user of the client device 110 (e.g., as a warning) that may specify that a particular triggering condition is currently present on the client device 110 and that further remedial actions may be taken with respect to the client device 110 if the triggering condition remains present on the client devices 110 after a particular threshold duration has expired (i.e., after a grace period for incompliance has expired). Additionally, the notification may be transmitted to an administrator of the client device 110 that specifies that a particular triggering condition is present on the client device 110. Furthermore, the notification may be transmitted to a management service 210 that specifies that a particular triggering condition is present on the client device 110, which may be used by the management service 210 to update the management records 230 associated with the client device 110 to reflect the occurrence of the triggering condition on the client device 110.

Embodiments of the Management Service

Returning to the management service 210, the management service 210 may provide management capabilities with respect to the client device 110 and the above-described data stored by the management database 220. In some embodiments, the management service 210 may provide a user interface 215 via which a user may provide management inputs to the management service 210 that may instruct the management service 210 to perform certain management operations with respect to the client device 110. The user interface 215 may, for instance, provide a plurality of "management dashboards" that may assist in receiving management inputs from a user. For instance, the user interface 215 (and included management dashboards) may provide the capability to initiate certain management operations with respect to the client device 110 (e.g., a determination of whether the client device 110 is compliant with at least one profile 256, a designation of at least one particular procedure call 240 for provision to (and enforcement upon) the client device 110, a designation of at least one resource 250 for provisioning to the client device 110.)

In some embodiments, the management service 210 may provide an administrative portal through which a user with administrative privileges (i.e., an administrator) may initiate management operations with respect to the client device 110. In another embodiment, the management service 210 may provide an end user portal, sometimes referred to as a self service portal, through which a user of the client device 110 may initiate management operations with respect to the client device 110. In some embodiments, the end user portal may provide only a subset of the management operations provided by administrative portal; that is, administrators of the management service 210 may be privileged to initiate management operations with respect to the client device 110 that users of the client device 110 are not privileged to initiate.

In certain embodiments, the management service 210 may be configured to determine whether the client device 110 is compliant with at least one profile 256 (and any included credentials 257, configurations 258, and/or compliance rules 259). In one embodiment, the management service 210 may query at least one management record 230 associated with the client device 110 to identify at least one profile 256 that is associated with the client device 110 such that the management service 210 may determine whether the client device 110 is compliant. In other embodiments, the management service 210 may receive any profiles 256 associated with the client device 110 from the client device 110.

Once the management service 210 has identified the profiles 256 associated with the client device 110, the management service 210 may determine whether the client device 110 is compliant with such profiles 256 based at least in part on status information describing the client device 110. In some embodiments, the management service 210 may transmit a check-in procedure call 240 to the client device 110 to instruct the client device 110 to transmit at least a portion of the status information 316 describing the client device 110 (depicted in FIG. 3) to the management service 210, which may provide a basis for determining whether the client device 110 is compliant with any profiles 256 associated with the client device 110. Additionally, the management service 210 may query the management record 230 of the client device 110 to determine whether the management record 230 specifies status information describing the client device 110.

Having obtained status information describing the client device 110, the management service 210 may proceed to determine whether the client device 110 is compliant with the profiles 256 associated with the client device 110. For instance, the management service 210 may use the status information describing the client device 110 to determine whether the credentials 257 (of the profiles 256) are present on the client device 110. Additionally, the management service 210 may use the status information describing the client device 110 to determine whether the configurations 258 (of the profiles 256) are enabled on the client device 110. Furthermore, the management service 210 may use the status information describing the client device 110 to determine whether the client device 110 violates any compliance rules 259 (of profiles 256). If the management service 210 determines that the client device 110 complies with the profiles 256 associated with the client device 110, the management service 210 may report the compliant status as an output of the management operation (e.g., as a message to the individual who initiated the management operation). On the other hand, if the management service 210 determines that the client device 110 does not comply with the profiles 256 associated with the client device 110, the management service may report the non-compliant status as an output of the management operation (e.g., as a message) and may further perform a secondary management operation to rectify the non-compliant status of the client device (e.g., at least one remedial action specified by the compliance rules 259).

In certain embodiments, the management service 210 may provision at least one procedure call 240 and/or at least one resource 250 to the client device 110 (which have been designated for provisioning to the client device 110). In some embodiments, the management service 210 may provision procedure calls 240 and/or resources 250 to the client device 110 by transmitting (or "pushing") them to the client device 110. This embodiment for provisioning may not, however, be viable for provisioning the client device 110 if the client device 110 is utilizing an operating system 330 that prohibits "push" methods of provisioning (e.g., a client device 110 utilizing the Apple iOS™ operating system 330). Consequently, in some embodiments, the management service 210 may provision the client device 110 by requesting that the client device 110 download (i.e., "pull") the procedure calls 240 and/or resources 250 from the management service 210. More specifically, upon a request to provision the client device 110, the management service 210 may place a download command associated with the procedure calls 240 and/or resources 250 in a command queue associated with the client device 110, may transmit a notification requesting that the client device 110 check-in with the management service 210, and may transmit the procedure calls 240 and/or resources 250 to the client device 110 upon the client device's 110 check-in with the management service 210.

In certain embodiments, the management service 210 may be configured to place at least one resource 250 in the management database 220 for storage, which may be later provisioned to the client device 110. In some embodiments, users of the management service 210 may upload resources 250 for storage by the management service 210 in the management store through the user interface 215 (e.g., through a resource upload dashboard). Additionally, the management service 210 may establish a communication channel with at least one remote resource 250 service, such as an app service 280 and/or a content service 290, from which the management service 210 may receive particular resources 250 for storage in the management database 220.

In certain embodiments, the app service 280 or content service 290 may store and distribute apps 252 and/or content 254, respectively. In some embodiments, the app service 280 or content service 290 may proxy apps 252 or content 254, respectively, to the client device 110 from the management server 205. For instance, the app service 280 or content service 290 may receive apps 252 or content 254, respectively, from the management server 205, and may relay (i.e., distribute) the received apps 252 or content 254 to the client device 110. In some embodiments, such as when the app service 280 or content service 290 act as a proxy, the management service 210 may distribute at least one procedure call 240 to the app service 280 or content service 290, which may instruct the app service 280 or content service 290 to perform certain functionality. For instance, the management service 210 may transmit a Microsoft PowerShell™ procedure call 240 to the app service 280 or content service 290 to instruct the app service 280 or content service 290 to only proxy apps 252 or content 254, respectively, to the client device 110 while the client device 110 is in a state of compliance with at least one compliance rule 259.

Additional Embodiments of the Management System

As described herein, in certain embodiments, at least one notification service 260, at least one gateway service 270, at least one app service 280, and at least one content service 290 may assist the management server 205 in providing management capabilities with respect to the client device 110. Each of these additional components of the management system 200 will now be described in further detail.

In certain embodiments, limitations of the client device 110 may require that the management service 210 transmit notifications to the client device 110 through at least one notification service 260 (e.g., requests to check-in with the management service 210). In particular, the management service 210 may be required to transmit notifications to the client device 110 via the notification service 260 in an instance in which an operating system 330 of the client device 110 is configured to only accept notifications from the notification service 260 (e.g., client devices 110 running Apple iOS™ may only receive notifications through a notification service 260 provided by Apple™). Accordingly, in one embodiment, the management service 210 may be configured to transmit notifications to the client device 110 by transmitting the notifications to the notification service 260 and instructing the notification service 260 to relay such notifications to the client device 110 on its behalf, and the notification service 260 may be configured to receive notifications from the management service 210 and transmit such notifications to the client device 110 on behalf of the management service 210 in response to receiving instructions from the management service 210 specifying that the notification service 260 should relay the notifications to the client device 110.

In an instance in which the client device 110 receives a notification to check-in with the management service 210, the client device 110 may request to establish a communication channel with the management service 210. In certain embodiments, the client device 110 may be permitted to communicate directly with the management service 210. However, in some embodiments, the client device 110 may be required to communicate with the management service 210 via at least one gateway service 270 (e.g., when the client device 110 has access to a server address and/or server credentials for the gateway service 270, but does not have access to a server address and/or server credentials for the management service 210).

In certain embodiments, the gateway service 270 may be configured to determine whether the client device 110 is authorized to communicate with the management service 210. For instance, the client device 110 may only be authorized to communicate with the management service 210 when the client device 110 is in compliance with the profiles 256 associated with the client device 110. The gateway service 270 may perform its determination of whether the client device 110 is compliant with profiles 256 in a similar manner to the methods described above with respect to management service 210.

In an instance in which the gateway service 270 determines that the client device 110 is authorized to communicate with the management service 210, the gateway service 270 may relay the client device's 110 communications to the management service 210 on behalf of the client device 110. On the other hand, in an instance in which the gateway service 270 determines that the client device 110 is not authorized to communicate with the management service 210, the gateway service 270 may prevent the client device's 110 communications from being transmitted to the management service 210. Additionally, the gateway service 270 may be further configured to perform at least one remedial action with respect to the client device 110, as described herein. While the gateway service 270 is described with respect to authorizing communication between the client device 110 and the management service 210, the gateway service 270 may also be configured to determine whether the client device 110 is authorized to communicate with other services (such as the app service 280 and/or content service 290) and may permit the client device 110 to communicate and/or download resources 250 from such services in an instance in which it is determined that the client device 110 is authorized to communicate with such services (e.g., per the compliance rules 259).

In an instance in which the client device 110 establishes a communication channel with the management service 210 (whether directly or through the gateway service 270), the client device 110 may check-in with the management service 210 and may receive at least one procedure call 240 and/or at least one resource 250 from a command queue associated with the client device 110. In some embodiments, the client device 110 may "check-in" by transmitting its status information 316 (depicted in FIG. 3) to the management service 210, which the management service 210 may use to update the management record 230 associated with the client device 110. Additionally, in some embodiments, the management service 210 may determine whether the client device 110 is authorized to receive any procedure calls 240 and/or resources 250 in a command queue associated with the client device 110 before permitting the client device 110 to download the procedure calls 240 and/or resources 250 by determining whether the client device 110 complies with certain profiles 256 associated with such procedure calls 240 and/or resources 250. In an instance in which the management service 210 determines that the particular client device 110 is authorized to receive procedure calls 240, the management service 210 may permit the client device 110 to download the procedure calls 240 and/or resources 250 from the management service 210 (e.g., directly, through the gateway service 270).

In certain embodiments, the app service 280 may comprise at least one app store (i.e., application repositories) from which the client device 110 may download apps 252, such as the AirWatch App Catalogue™, Apple iOS App Store™, Google Play Store™, BlackBerry World™, Windows Phone Store™, Amazon Appstore™, SlideME™, Steam™, Windows Store™, Mac App Store™, or Ubuntu Software Center™. In one embodiment, the app service 280 may comprise a service that executes apps 252 that the client device 110 may access over the network 120 (i.e., web-based apps 252), such as Google Apps™. In one embodiment, the app service 280 may be specific to the capabilities of the client device 110. For instance, the app service 280 may be specific to the operating system 330 of the client device 110; that is, the client device 110 may communicate with a particular app service 280 that correlates with the operating system 330 of the client device 110. Thus, for example, a client device 110 running the Apple iOS operating system 330 may be configured to communicate with the Apple iOS App Store, through which the client device 110 may access apps 252 specific to the Apple iOS operating system 330 of the client device 110 (i.e., apps 252 capable of being executed by Apple iOS operating system 330). Additionally, in some embodiments, the client device 110 may only be permitted (or configured) to communicate with a particular app service 280 that is associated with the client device 110 (e.g., an app service 280 specific to the capabilities of the client device 110, specific to a management agent 310 of the client device, or specific to the management service 210).

In certain embodiments, the content service 290 may comprise at least one content store (i.e., file repositories), such as Salesforce.com™, Dropbox™, Box™, Egnyte™, NetSuite™, Citrix ShareFile™, Rackspace™, Amazon Web Services™, Google Drive™, BackupGenie™, SugarSync™, Mozy™, Bitcasa Infinite Drive™ MediaFire™, Mega™, Ubunto One™, Huddle™, Evernote™, Microsoft SharePoint™ Microsoft Office365™, Microsoft SkyDrive™, or Apple iCloud™. In some embodiments, the content service 290 may include at least one email service (e.g., a service configured to distribute email to the client device 110), such as Microsoft Exchange™, Novell GroupWise™, Lotus Notes™, or Google GMail™. In some embodiments, similar to the app service 280, the content service 290 may be specific to the capabilities of the client device 110 such that the client device 110 may receive content 254 that the client device 110 is capable of accessing. For instance, the client device 110 may communicate with a particular content service 290 based at least in part on the apps 252 accessible to the client device 110, such that the client device 110 may receive content 254 that is accessible (i.e., that may be rendered) by such apps 252. Alternatively, for example, the content service 290 may distribute particular content 254 to the client device 110 based on the apps 252 accessible to the client device 110, such that the client device 110 does not receive content 254 that cannot be accessed (i.e., as a result of needing a particular app 252 that is not accessible to the client device 110).

FIG. 3 illustrates a schematic representation of an example management system 300 which may be configured according to example embodiments of the present invention. While FIG. 3 illustrates one example configuration of the management system 300, numerous other configurations may be used according to some example embodiments. With respect to FIG. 3, the management system 300 may comprise at least one client device 110, at least one management server 205, and various sub-components contained therein, as described herein. In some embodiments, the management system 300 may be particularly useful for providing local management of a plurality of functionality provided by the client device 110.

Embodiments of the Client Device

In certain embodiments, the client device 110 may comprise at least one processor 340 (e.g., a processor, co-processor, and/or processing circuitry) and at least one memory 302. Depending on the configuration and type of client device 110, the memory 302 may comprise volatile (e.g., random access memory (RAM)), non-volatile (e.g., read-only memory (ROM)), flash memory, or any combination thereof). The memory 302 may store executable programs (e.g., program code instructions) and related data components of various applications and modules for execution by the processor 340. The memory 302 may be communicatively coupled to the processor 340 (e.g., through at least one system bus for transferring data there between).

Basic functionality of the client device 110 may be provided by at least one operating system 330, which may be stored in the memory 302 of the client device 110 and may be executed by the processor 340 of the client device 110. In certain embodiments, at least one programmed software application (i.e., "app" 252) may be executed by utilizing the computing resources of the client device 110. For example, an app 252 stored in the memory 302 of the client device 110 may be executed by the processor 340 of the client device 110 under the auspices of the operating system 330 of the client device 110. More specifically, the processor 340 of the client device 110 may be configured to execute a plurality of apps 252, such as a web browsing app 252, an email client app 252, an instant messaging app 252, an app 252 configured to securely view and/or modify content 254, and/or an app 252 capable of accessing resources 250 provisioned to the client device 110.

Data provided as an input to an app 252 and/or generated as output from an app 252 may be stored in the memory 302 of the client device 110 and may be read by the processor 340 of the client device 110 as needed during the course of execution of the app 252. Data provided as an input to an app 252 may be data stored in the memory 302 of the client device 110 by a secondary app 252 or other source either internal or external to client device 110 (e.g., the operating system 330 of the client device 110), or may be provided to the app 252 during installation of the app 252.

The client device 110 may include at least one communication port 350. It will be understood that although a single communication port 350 is depicted, any number of communication ports 350 may be present according to other example configurations of the client device 110. In some embodiments, the communication port 350 may be configured to provide the client device 110 with a communication channel to other devices, such as the management server 205, and/or remote services, such as another client device 110, the management service 210, the notification service 260, the gateway service 270, the app service 280, or the content service 290. For instance, the client device 110 may be managed (and/or provisioned with resources 250) by the management service 210 (e.g., directly, through the gateway service 270) with the assistance of the communication port 350, which may facilitate a communication channel between the client device 110 and the appropriate remote service.

More specifically, the communication port 350 may include components such as a wireless network connectivity interface, an Ethernet network adapter, and/or a modem that may assist in connecting the client device 110 to the network 120, other devices, or other services, as described herein. For example, the wireless network connectivity interface may comprise one or more of a wireless radio transceiver, PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, and/or the like. According to some embodiments, the communication port 350 may additionally or alternatively include at least one antenna, supporting hardware and/or software, and/or supporting circuitry configured to receive and/or transmit signals according to any short-range communication protocols and/or standards, such as, for example, near field communication (NFC), Bluetooth, and/or Bluetooth Low Energy (BLE). According to some embodiments, the communication port 350 may additionally or alternatively include at least one interface configured to provide location services, such as at least one antenna, supporting hardware and/or software, and/or supporting circuitry configured to receive signals transmitted from GPS satellites.

In certain embodiments, the client device 110 may receive data as user input via at least one input/output interface 360, such as a keyboard, a mouse, a pen, a stylus, a sound input device, a touch input device, a biometric device, a capture device, a brain-computer interface (BCI), and/or the like. The input/output interfaces 360 may additionally or alternatively include at least one sensing device, such as a camera, a microphone, a motion detector, a proximity sensor, and/or a biometric sensors (i.e., a sensor configured to capture visual, aural, physical, and/or other types of stimuli and/or information, such as spoken words, motions, gestures, and biometric signatures).

Similarly, in some embodiments, the client device 110 may present data to a user of the client device 110 via the input/output interfaces 360, such as data generated by apps 252 (e.g., a user interface (UI), etc.) during the execution of the apps 252. The input/output interfaces 360 may include at least one device configured to provide information and/or stimuli to a user of the client device 110. In particular, the input/output interfaces 360 may include at least one of a display device (e.g., monitor, screen and/or touchscreen), speakers, a force, vibration, and/or haptic feedback generating device, an implanted and/or a physiologically integrated output device, and a heads-up display device. It will be understood that although the input/output interfaces 360 are depicted as a combined component in FIG. 3, they may, according to example embodiments, be embodied by at least one component that exclusively provides input functionality or output functionality.

In certain embodiments, the memory 302 of a client device 110 may include a platform library 320. The platform library 320 may include a plurality of procedures (i.e., computing functionality), which may include procedures that may be useful to the operating system of a client device 110, apps 252 accessible to the client device 110, and/or remote services communicatively coupled to the client device 110 (e.g., the management service 210). In one embodiment, the platform library 320 may include a plurality of system utilities (i.e., procedures required for the maintenance of the client device 110 itself). In one embodiment, the platform library 320 may include a software development kit (SDK) (i.e., procedures required for at least one app 252 accessible to the client device 110). These procedures may be accessed by the client device 110 as needed so that the operating system 330, apps 252, and/or remote services do not have to include the procedures in their codebase, which may provide for memory consumption savings and a consistent user experience.

In some embodiments, the procedures of the platform library 320 may be implemented on the client device 110 through at least one application programming interface (API). More specifically, an API may be configured to listen for (i.e., maintain an open port via which it may receive) a corresponding procedure call 240; that is, an API may correspond to a procedure call 240 such that the API recognizes the procedure call 240 as a valid and authorized request to perform at least one particular procedure of the platform library 320. In an instance in which an API receives a corresponding procedure call 240, the API may relay the procedure call 240 to the corresponding procedure of the platform library 320 such that the procedure is performed by the client device 110. For instance, when an API for erasing all data from the client device 110 receives a procedure call 240 instructing the client device 110 to erase all data from the client device 110, the API may direct the operating system 330 of the client device 110 to the location of the procedure in the platform library 320 (i.e., the codebase for erasing all data from the client device 110) such that the operating system 330 of the client device 110 may process the procedure, which may in turn erase all data from the client device 110.

In certain embodiments, the memory 302 of the client device 110 may further include a plurality of personal data 305. Personal data 305 may include, for instance, any data accessible to (and/or stored within) a client device 110 that is personal to a user of the client device 110; that is, personal data 305 may be distinct from provisioned data 150 (i.e., management records 230, procedure calls 240, resources 250) in that provisioned data 150 may not be personal to the user of the client device 110 because the provisioned data 150 may be personal to a particular enterprise 130. Nevertheless, similar to provisioned data 150 (specifically, resources 250), personal data 305 may include apps 252, content 254, and/or profiles 256. Additionally, in some embodiments, personal data 305 may include user data associated with at least one user of the client device 110. For example, user data may include at least one user preference (i.e., parameters that may affect the experience of the user) and/or at least one characteristic describing a user (e.g., a user's age, gender, bodily traits).

Embodiments for Management of the Client Device

In certain embodiments, the memory 302 of the client device 110 may further include a plurality of components that may provide the capability to locally perform management operations with respect to the client device 110. More specifically, the memory 302 of the client device 110 may include a plurality of provisioned data 150 (i.e., at least one management record 230, at least one resource 250) and at least one management agent 310. In one embodiment, as described herein, resources 250 may include apps 252, content 254, and profiles 256 (which may include credentials 257, configurations 258, and compliance rules 259).

Additionally, as described herein, the management record 230 may include status information 316 describing the client device 110, which will be now be described in further detail. In some embodiments, at least a portion of the management record 230 (and any included status information 316) may be synchronized between the client device 110 and the management server 205; that is, a management record 230 stored on the client device 110 and a management record 230 stored on the management server 205 may be updated upon a change to either management record 230 such that the two management records 230 include the same information. For instance, the management agent 310 and the management service 210 may establish a communicative connection through which the management agent 310 and the management service 210 may notify one another of any changes to their respective management records 230 describing the client device 110, which may provide a basis for the other party (i.e., the management agent 310 or the management service 210) to update its respective management record 230 describing the client device 110.

In certain embodiments, the status information 316 of the management record 230 may describe the client device 110; that is, the status information 316 may provide at least one indication of the "state" of the client device 110. In some embodiments, the status information 316 may include information describing the client device 110 itself. For example, the status information 316 may include hardware specifications of the client device 110, version and/or configuration information of various software program and/or hardware components installed on the client device 110, data transmission protocols enabled on the client device 110, version and usage information of various resources 250 accessible to the client device 110, information regarding any errors or faults detected on the client device 110. Additionally, the status information 316 may include and/or describe at least one of the following characteristics of the client device 110: device name, device UDID, phone number, IMEI/MEID number, device serial number, IMSI number, device model, device model name, manufacturer, operating system 330 version, operating system 330 build, firmware/kernel version, battery available, battery capacity, memory available, memory capacity, Wi-Fi address, Wi-Fi MAC, Wi-Fi signal strength, carrier settings version, cellular signal strength, cellular technology (e.g., GSM, CDMA, LTE, 4G, 3G, EDGE), current MCC, current MNC, SIM card number, SIM carrier network, subscriber MMC, subscriber MNC, Bluetooth MAC, data usage via cellular network, data usage via Wi-Fi network, phone call history, text message history (e.g., SMS, MMS), roaming status (e.g., generally, data usage while roaming, phone calls made while roaming, text messages sent while roaming), current carrier network, current network status, current cellular tower information, nearby cellular tower information, installed apps 252, installed app 252 versions, and app 252 usage statistics.

Additionally, in some embodiments, the status information 316 may describe contextual details associated with the client device 110. For example, the status information 316 may include at least one geographic location where the client device 110 has been (or is currently) located, at least one time when the client device 110 has been (or is being) operated, information regarding an enterprise 130 and/or IT Department 140 associated with the client device 110, information regarding management of the client device 110 by the management service 210 (e.g., dates/times when the client device 110 was provisioned with provisioned data 150, dates/times when the client device 110 has checked-in with the management service 210), information regarding at least one use of the client device 110 (e.g., logs of usage of apps 252 on the client device 110, logs of access to content 254 on the client device 110), and/or information regarding at least one charge resulting from uses of the client device 110 (e.g., cellular data charges, roaming charges, app 252 purchases).

In certain embodiments, the management agent 310 may provide local management of the client device 110 on behalf of the management server 205. In some embodiments, the management agent 310 may comprise a software component (e.g., an app 252, a local service) that is configured to perform management operations with respect to the client device 110.

For instance, in some embodiments, the management agent 310 may have heightened privileges with respect to the client device 110 (e.g., root access, administrative rights), such that the management agent 310 may instruct the operating system 330 of the client device 110 to perform certain procedures; that is, the management agent 310 may be configured to perform certain procedures that are not available to apps 252 without heightened privileges. In some embodiments, a manufacturer or cellular carrier of the client device 110 may install the management component 310 on the client device 110 before the client device 110 is provided to a user of the client device 110 (e.g., MDM service on Apple iOS). In one embodiment, a user (or administrator) of the client device 110 may install the management agent 310 on the client device 110 after the client device 110 is provided by a manufacturer or cellular carrier of the client device 110 (e.g., AirWatch Mobile Device Management Agent™, AirWatch Workspace Agent™, Apps 252 wrapped with app management wrappers, Apps 252 developed using the an app management SDK, VMware Virtualization Hypervisor™).

In certain embodiments, the management agent 310 may include at least one communication module 312 and at least one implementation module 314, which may assist in providing management capabilities with respect to the client device 110. In some embodiments, management agent 310 may be configured to establish a direct communicative coupling with the management server 205 through which the management agent 310 may transmit data to and from the management service 210. In other embodiments, however, the communication module 312 may be configured to establish a communicative coupling with the management server 205 through which the management agent 310 may transmit data to and from the management service 210. For instance, the communication module 312 may receive a plurality of provisioned data 150 (e.g., management records 230, procedure calls 240, resources 250) in addition to instance user interfaces for engaging with restricted resources 250 from the management service 210. Additionally, for instance, the communication module 312 may transmit information to the management service 210 (e.g., management records 230, status information 316 of management records 230, requests for access to restricted resources 250) which may assist the management service 210 providing management capabilities with respect to the client device 110. Similarly, in some embodiments, the communication module 312 may be configured to establish a communicative coupling with one or more of the notification service 260, the gateway service 270, the app service 280, and the content service 290 through which the management agent 310 may transmit data to and from each respective service.

In some embodiments, the implementation module 314 may be operable to modify (e.g., configure, constrain, restrict, add to, enhance) the operations of the client device 110 in accordance with provisioned data 150. The implementation module 314 may, for example, be provided access to provisioned data 150 by the communication module 312 once the communication module 312 receives the provisioned data 150 (e.g., from the management service 210 or other services). For example, the implementation module 314 may be provided access to an instance of a UI for interacting with an instance of a restricted resource 250. In one embodiment, an implementation module 314 may be in direct communicative coupling with an aggregate generator 318, as may a management agent 310. As described herein, the management agent 310 (including the implementation module 314) may have heightened privileges with respect to the client device 110, which may allow the implementation module 314 to instruct the client device 110 (e.g., the operating system 330 of the client device 110, apps 252 executed by the client device 110) to modify its operations in accordance with the provisioned data 150.

In some embodiments, the implementation module 314 may act as a conduit of the management service 210; that is, the implementation module 314 may modify the operations of the client device 110 upon receiving access to the provisioned data 150. For instance, the implementation module 314 may, upon receiving access to resources 250, instruct the client device 110 to store the resources 250 in an encrypted format (e.g., as specified by configurations 258 associated with the resources 250). Additionally, in some embodiments, the implementation module 314 may act autonomously; that is, the implementation module 314 may modify the operations of the client device 110 in an instance in which the provisioned data 150 requires the operations of the client device 110 to be modified. For example, the implementation module 314 may instruct the client device 110 to store resources 250 in an encrypted format in response to a determination that the client device 110 has been jailbroken by a user of the client device 110 (e.g., as specified by compliance rules 259 associated with the resources 250). Accordingly, the management agent 310 may be particularly useful for managing the client device when the client device 110 is offline (i.e., not communicatively coupled to the management service 210), as the management agent 310 may continue to manage the client device 110 irrespective of the client device 110 being offline (whereas the management service 210 may require a communicative coupling to the client device 110 for the management service 210 to perform certain management operations with respect to the client device 110, such as transmitting procedure calls 240 to the client device 110).

As noted, in one embodiment, the management agent 310, including the implementation module 314, may be communicatively coupled to an aggregate generator 318. As discussed, in one embodiment, a profile 256 may designate a resource 250 as a server-device resource 250. In such an instance, aspects of the resource 250 may be executable on the client device 110, while other aspects of the resource 250 may be executable on a remote server (e.g., management server 205). In one embodiment, the management agent 310, including the implementation module 314, may transmit a UI for interfacing with client device-side aspects of the resource 250 to the aggregate generator 318. Additionally, upon receipt of an instance of a UI for interacting with the server-side aspects of the resource 250, the communications module 312 (or management agent 310) may transmit the instance UI to the aggregate generator 318. Accordingly, in one embodiment, the aggregate generator 318 may generate an aggregate UI such that the UI for interfacing with client device-side aspects of the resource 250 (i.e., the native UI) and the instance of the UI for interacting with the server-side aspects of the resource 250 are fused into a resultant element (i.e., an aggregate UI) for engaging the resource 250, which is configured for presentation to the user. As will be understood and appreciated, aspects of the present disclosure may present the fused UI (i.e., the aggregate UI) to the client device user in a transparent manner such that the user may not perceive that a restricted version of the resource 250 is being accessed. In other words, the aggregate generator 318 may run silently in the background to fuse an instance of a UI for interacting with server-side aspects of a resource 250 with the native UI.

In one embodiment, as opposed to an actual resource or manipulable file, the aggregate UI comprises code being processed such that it can be output for display on a client device 110. Accordingly, attempts to manipulate the aggregate UI (e.g., copy, paste, transmit, save, etc.) would be futile. As will be understood and appreciated, because the aggregate UI cannot be manipulated, the restricted resource 250 (or aspects of the restricted resource 250) are provided additional security. Further, in one embodiment, as an additional security measure, an aggregate UI could be watermarked according to various compliance rules.

Returning to the management agent 310, the management agent 310 may be configured to perform a plurality of management operations with respect to the client device 110 (i.e., with the assistance of the communication module 312 and/or implementation module 314). In particular, the management agent 310 may perform management operations related to management records 230, procedure calls 240, and resources 250. Each of these embodiments will now be described in further detail.

In certain embodiments, the management agent 310 may be configured to perform management operations related to any management records 230 associated with the client device 110 (e.g., those specific to the client device 110). In some embodiments, the management agent 310 may provide local management of management records 230. For instance, the management agent 310 may update management records 230 to reflect any management operations performed with respect to the client device 110, as described herein. Additionally, for example, the management agent 310 may update the status information 316 of management records 230 to ensure that the management records 230 accurately describe the client device 110; that is, the management agent 310 may monitor the operations of the client device 110 to detect whether the status information 316 remains accurate, and may update the status information 316 in the event that the status information 316 no longer accurately describes the client device 110. Furthermore, in some embodiments, the management agent 310 may provide synchronization services with respect to the management records 230. For example, the management agent 310 may transmit at least a portion of the management records 230 to the management service 210 such that the management records 230 for the client device 110 are identical (i.e., the management records 230 stored locally on the client device 110 and the management records 230 stored remotely on the management server 205), as described herein.

In certain embodiments, the management agent 310 may be configured to perform management operations related to any procedure calls 240 designated for implementation on the client device 110 (e.g., procedure calls 240 provisioned to the client device 110 by the management service 210). As described herein, in some embodiments, the management agent 310 may have heightened privileges with respect to the client device 110 that may permit the management agent 310 to instruct the client device 110 to implement procedure calls 240. In one embodiment, the management agent 310 may have "root" access to the operating system 330 of the client device 110 (i.e., permission to control the operations of the operating system 330), which may provide the management agent 310 with the capability to instruct the operating system 330 to implement procedure calls 240. Additionally, in some embodiments, the management agent 310 may have administrative privileges with respect to the platform library 320 of the client device 110, which may permit the management agent 310 to pass procedure calls 240 an API of the client device 110 which may then in turn trigger the performance of the procedure calls 240, as described herein.

Furthermore, in certain embodiments, the management agent 310 may include a plurality of procedures within the code-base of the management agent 310 (i.e., a "management agent platform library) that may be either locally requested (e.g., by the management agent 310 or apps 252 communicatively coupled to the management agent 310) or remotely requested (e.g., by the management server 205). More specifically, the management agent platform library may provide for the management agent 310 to perform certain operations requested by procedure calls 240 without any assistance from the operating system 330 or the platform library 320 of the client device 110. In this regard, the management agent 310 may listen for procedure calls 240 to procedures of the management agent platform library and may execute the procedures when valid and authorized procedure calls 240 are received. In some embodiments, the management agent 310 may utilize the management agent platform library to perform operations that are not supported or provided for by the operating system 330 or platform library 320 of the client device 110 (e.g., root access detection, jailbreak detection).

In certain embodiments, the management agent 310 may be configured to perform management operations related to any resources 250 provisioned to the client device 110 (e.g., those provisioned by the management service 210). In one embodiment, the management agent 310 may instruct the client device 110 to store resources 250 in accordance with profiles 256 associated with the resources 250. For instance, the management agent 310 may instruct the client device 110 to store the resources 250 in a containerized portion of memory 302 as specified by a profile 256 associated with the resources 250. Additionally, in some embodiments, the management agent 310 may provide access to resources 250 in accordance with profiles 256 associated with the resources 250. For instance, the management agent 310 may provide apps 252 with credentials 257 associated with the enterprise 130 (as specified by profiles 256 associated with the apps 252) when a user of the client device 110 requests access to the apps 252, which may facilitate the apps 252 in obtaining resources 250 associated with the enterprise 130. Moreover, for example, the management agent 310 may encrypt all resources 250 stored by the client device 110 with a particular encryption key in accordance with a configuration 258 associated with the resources 250, and may provide a proper decryption key to apps 252 executed by the client device 110 when such apps 252 require access to the resources 250.

In certain embodiments, the management agent 310 may monitor the operations of the client device 110 to determine whether the client device 110 satisfies compliance rules 259. For instance, in some embodiments, the management agent 310 may monitor hardware features of the client device 110, software features of the client device 110, apps 252 executed by the client device 110, data in transit to and/or from the client device 110 (e.g., to determine whether the data includes remote procedure calls 240), and/or other characteristics of the client device 110 to determine whether at least one triggering condition is present on the client device 110 (e.g., triggering conditions specified by compliance rules 259). Additionally, in some embodiments, the management agent 310 may perform at least one remedial action with respect to the client device 110 in an instance in which at least one triggering condition (paired with the remedial actions) is present on the client device 110 (e.g., remedial actions specified by compliance rules 259). For example, the management agent 310 may instruct the operating system 330 of the client device 110 to perform a device lock on the client device 110 in an instance in which at least one function of the client device 110 associated with a particular enterprise is performed outside of standard workday hours (i.e., the presence of a triggering condition on the client device 110).

In certain embodiments, the management agent 310 may query the management record 230 to determine whether the client device 110 satisfies the compliance rules 259. In particular, the management agent 310 may determine whether information included in the management records 230 indicates that the compliance rules 259 are satisfied or are not satisfied (e.g., the status information 316). For instance, the management agent 310 may determine that a compliance rule 259 specifying that the client device 110 may only be used within the USA is not satisfied when the status information 316 describing the client device 110 indicates that the client device 110 is currently located in Europe, which may in turn prompt the management agent 310 to perform any remedial actions specified by the compliance rule 259 (i.e., as a result of the presence of the triggering condition on the client device 110).

In certain embodiments, the management agent 310 may request the assistance management service 210 to determine whether compliance rules 259 are satisfied. In some embodiments, the management agent 310 may transmit a request to the management service 210 that requests that the management service 210 determine whether compliance rules 259 are satisfied by the client device 110, which may further include the particular compliance rules 259 in question. Additionally, in some embodiments, the management agent 310 may transmit at least a portion of the management record 230 (and any included status information 316) of the client device 110 to the management service 210, which the management service 210 may use as an additional basis for determining whether compliance rules 259 are satisfied. In any case, the management agent 310 may receive a response from the management service 210 specifying whether the client device 110 satisfies the compliance rules 259.

Furthermore, in certain embodiments, the management agent 310 may query the client device 110 "on-the-fly" to determine whether compliance rules 259 are satisfied. In some embodiments, the management agent 310 of the client device 110 may not maintain management records 230 or status information 316; accordingly, the management agent 310 of the client device 110 may query various components of the client device 110 in an on demand manner to determine whether the state of the client device 110 satisfies compliance rules 259. For instance, the management agent 310 of the client device 110 may communicate with the operating system 330 of the client device 110 to obtain an "apps list" that specifies all apps 252 that are installed on the client device 110, which the management agent 310 may use to determine whether an app 252 designated by a compliance rule 259 as prohibited is installed on the client device to determine whether the compliance rule 259 is satisfied.

Figure 4:
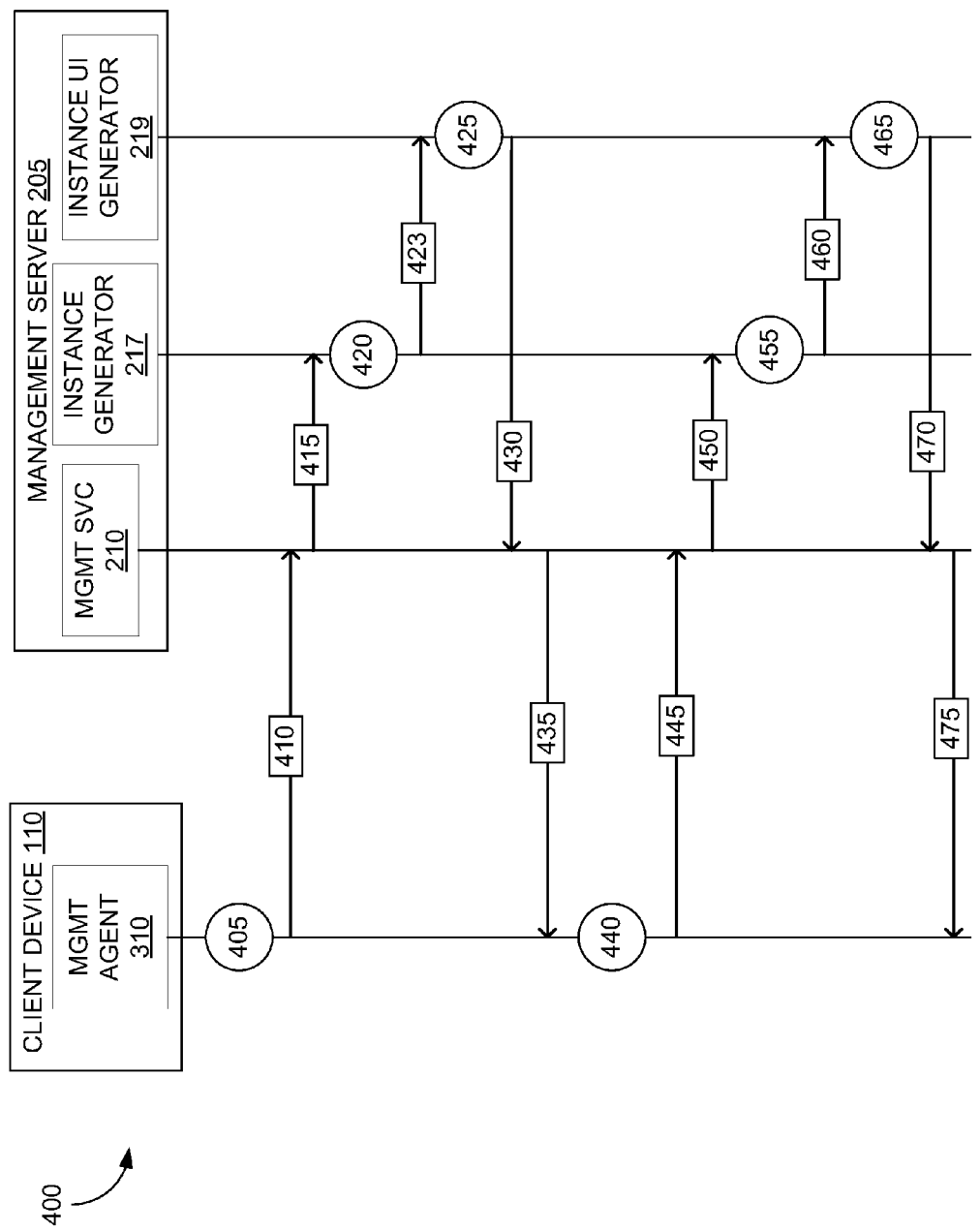
FIGS. 4 and 5 are sequence diagrams illustrating example processes that may be performed in accordance with example embodiments of the present disclosure.

FIG. 4 illustrates an exemplary sequence diagram of a process 400 as carried out by the systems, methods, and computer program products of the present disclosure. As discussed herein, in one embodiment, a user such as an administrator of an IT Department 140 may manage aspects of client devices 110 via a management server 205. For example, an administrator may create various profiles 256 that modify (e.g., configure, constrain, manage) the manner in which particular client devices 110 may be operated. In particular, an administrator may configure profiles 256 that manage or constrain certain resources 250, which may include apps 252 and/or content 254. In one embodiment, profiles 256 may be configured to constrain the manner in which a user of a client device 110 may engage such resources 250 (i.e., the profile 256 may indicate the resources 250 are restricted resources 250, as well as indicating apps 252 are restricted apps 252 and/or content 254 is restricted content 254.)

For example, in one embodiment, an administrator may identify certain resources 250, which may be enterprise content, that should be restricted. Accordingly, the administrator may configure a profile 256, which may comprise various configurations 258 and/or compliance rules 259, that constrains the manner in which a client device 110 interacts with the restricted resources 250. Accordingly, in the foregoing example, in one embodiment, an administrator may configure a profile 256 that constrains certain aspects of an app 252 (i.e., a restricted app 252) such that those aspects cannot be executed on a client device 110. Put differently, the administrator may, via the profile 256, designate the app 252 as "device/server," meaning certain aspects of the app 252 may be executed on the client device 110, while other aspects of the app 252 must be executed on a remote server (e.g., management server 205). In one embodiment, an administrator may configure a profile 256 that limits when and/or where a resource 250 can be executed on a client device. In one embodiment, an administrator may configure a profile 256 that specifies that access to certain resources 250 (i.e., certain restricted resources 250, restricted apps 252, and/or restricted content 254) should be limited in the interest of protecting sensitive enterprise information.

In another example, in one embodiment, an administrator may identify certain resources 250 (e.g., apps 252 and/or content 254), which may be enterprise content, that should be restricted under certain circumstances. Accordingly, the administrator may configure a profile 256 that includes various profile criteria such that the profile criteria relate to the client device 110 requesting access to the resource 250. In an example embodiment, status information 316 that describes the client device 110 may be evaluated to determine whether profile criteria are satisfied. Accordingly, evaluating a profile criterion to determine a processing restriction of a resource 250 may involve evaluating status information 316 describing the client device 110 requesting access to the resource 250. In an example embodiment, profile criteria may require a client device 110 that is requesting access to a resource 250 to enable one or more configurations 258, to utilize one or more credentials 257, and/or to satisfy one or more compliance rules 259. Further, in an example embodiment, profile criteria may relate to state details of the client device 210 (e.g., whether the client device 210 is in a factory default state, whether the client device 210 is in a jailbroken state, whether the client device 210 is connected to a secure network). Likewise, in an example embodiment, profile criteria may relate to technological characteristics of the client device 210 (e.g., hardware or software features enabled on the client device 210, resources 250 accessible to and/or stored by the client device 210). Additionally, in an example embodiment, profile criteria may relate to contextual characteristics of the client device 210 (e.g., geographic location of the client device 210, time of operation of the client device 210).

According to one embodiment of the present disclosure, an administrator may configure profiles 256 (including profile criteria) that apply varying degrees of restriction to resources 250 (e.g., restricted apps 252 and/or restricted content 254). For example, in one embodiment, a resource 250 may include or utilize information associated with an enterprise, which may include keywords related to the enterprise, information relating to contacts and/or personnel of the enterprise, information relating to the enterprise's intellectual property, information relating to the enterprise's finances, and/or the like. Accordingly, because of the sensitivity of the information associated with or utilized by the resource 250, an administrator may configure a profile 256 associated with the resource 252 that restricts the manner in which the resource 250 can be accessed. For example, the profile 256 may specify that the resource 250 is restricted from being executed on the client device 110 and must be processed at a remote computing device such as management server 205 (i.e., a processing restriction designates the resource 250 as "server-only"). Alternatively, the profile 256 may specify that only certain aspects of the resource 250 are restricted from being executed on the client device 110 (i.e., a processing restriction designates the resource 250 as "server-device"). In one embodiment, a profile 256 may be a static profile 256 (i.e., the restriction to aspects of the subject resource 250 (e.g., app 252 and/or content 254) may be an always-on or always-off decision). For example, a profile 256 may mandate that certain financial data (i.e., restricted content 254) can never be processed on a client device 110 (i.e., the processing restriction of the restricted content 254 is "server-only").

In one embodiment, the profile 256 associated with the resource 250 may include profile criteria relating to certain information relating to the client device 110 requesting access to the resource 250. For example, based on profile criteria, the profile 256 may specify that the resource 250 (or aspects of the resource 250) can be executed on the client device 110 in particular circumstances or depending on certain device- or environment-driven circumstances (e.g., between certain hours, when the client device 110 is located in certain geolocations, etc.). In other words, an administrator can configure a profile 256 such that it is dynamic (i.e., aspects of the subject resource 250 (e.g., app 252 and/or content 254), and various profile criteria are evaluated upon receipt of a request for access to the resource 250 to determine whether the requested resource 250 is subject to any processing restrictions depending on current circumstances, which may be reflected in state and/or status information relating to the client device 110).

As noted, in example embodiments, an administrator may configure a profile 256 that restricts certain aspects of a resource 250. For example, a profile 256 may allow execution of aspects of an app 252 on a client device 110 while constraining other aspects of the app 252 to execution on a remote server (e.g., management server 205). In one embodiment, for example, a profile 256 may be configured such that aspects of a restricted app 252 such as user settings and preferences can be executed on a client device 110. In addition, the profile 256 may specify that other aspects of the restricted app 252 (e.g., aspects relating to enterprise information) must be engaged via a remote server (e.g., management server 205). In such an example, a profile 256 associated with the restricted resource 250 may include a processing restriction designating the restricted resource 250 as "server-device," which, according to one embodiment, specifies that certain aspects of the resource 250 are constrained to execution on a remote server, while a mobile device user can engage other aspects directly via the client device 110. As will be understood and appreciated, because of the highly sensitive nature of certain enterprise information (e.g., resources 250, apps 252, and/or content 254), it may be desirable to store certain restricted resources 250, including restricted apps 252 and/or restricted content 254 remotely (e.g., at management server 205), thus limiting the amount of time the restricted resources 250 are stored on a client device 110, which in turn may limit the risk of a data breach if the client device 110 is lost or stolen.

As will be understood, with respect to execution or processing, resources 250 that are not constrained by a profile 256 (i.e., unrestricted resources), may be fully executable at a client device 110 and may be associated with a native user interface ("native UI") configured to present data associated with the unrestricted resource 250. In one embodiment, the native UI may be fully executable at the client device 110 and resides at the client device 110. Further, aspects of the native UI may be stored locally on the client device 110 (e.g., in memory 300). For example, the native UI may comprise settings and configurations relating to or specified by the user of the client device 110, which may be stored at the client device 110. Further, in one embodiment, aspects of the native user interface may be designated by one or more configurations 258.

As noted, however, certain profiles 256 may specify that certain restricted resources 250 or aspects of restricted resources 250 cannot be executed on a client device 110, according to one embodiment. Accordingly, in one embodiment, an instance generator 217 may generate an instance of the restricted resource 250, and an instance UI generator 219 may generate an instance UI that can allow a client device user to engage with a restricted resource 250 or the aspects of the restricted resource 250 that cannot be executed on the client device 110. In one embodiment, an aggregate generator 318 may be configured to receive the instance UI and generate a resultant element (i.e., aggregate UI) comprising the aspects of the native UI in addition to the instance UI for presentation to the client device user. For example, in one embodiment, in addition to the instance UI, the aggregate UI may also comprise aspects of the native UI (e.g., settings and configurations relating to or specified by the user of the client device 110).

In one embodiment, a profile 256 may specify that certain restricted resources 250 (e.g., restricted apps 252 and/or restricted content 242) cannot reside on a client device 110 or may reside only transiently on a client device 110. Accordingly, as discussed, in one embodiment, an instance UI or other representation of a restricted resource 250, which may be generated by an instance UI generator 219, may need to be merged (or fused) with a native UI associated with the restricted resource 250. Accordingly, as discussed, in one embodiment, the aggregate generator 318 may be configured to fuse the native UI with the instance UI to generate a resultant element (i.e., aggregate UI) for presentation to the user at the client device 110. Further, in one embodiment, to comply with a restriction that a restricted resource 250 is to reside on the client device 110 only transiently, an aggregate UI may be cleared from the memory 302 once the aggregate UI has been displayed. As will be understood and appreciated, the aggregate generator 318 may be configured to operate such that the user is agnostic to its presence. In other words, the aggregate generator 318 may run in the background to fuse an instance UI generated by an instance UI generator 219 with the native UI to generate the aggregate UI.

In certain embodiments, the aggregate generator 318 may be configured to operate in an "on-the-fly" manner. In other words, in one embodiment, generating an instance UI to allow engagement with restricted resources 250 (e.g., restricted apps 252 and/or restricted content 254) by an instance UI generator 219, transmitting the representations from the management server 205 to the client device 110, receiving the instance UI and fusing the instance UI with a native UI by an aggregate generator 318, and outputting for display the aggregate UI may occur nearly simultaneously. In other embodiments, however, an aggregate generator 318 may operate as part of a predictive process. For example, based on the current state of a restricted resource 250 (e.g., a restricted app 252) or a client device 110, the instance UI generator 219 may generate a plurality of instance UIs (based on the instance provided by the instance generator 217) representing various possible user operations or responses to potential user inputs. Put differently, the instance generator 217 may predict and process various user commands and, in response, the instance UI generator 219 may generate the various instance UIs that represent responses to the predicted user inputs based on the current state of the restricted resource 250 or client device 110. Accordingly, in one embodiment, upon receipt of an indication of a user input, the management agent 310 may query the management server 205 for the proper response to the user input, and in response, the management server 205 may transmit the proper instance UI, which was previously generated by the instance UI generator 219.

In an example embodiment, a user may request access to a restricted resource 250, which may be restricted content 254. For example, a profile 256 associated with particular content 254 (e.g., a spreadsheet) may specify that content is restricted because it contains sensitive enterprise data. Accordingly, upon receipt of an indication of a request to access the restricted content 254, a management agent 310 may request access to the restricted content 254 from a remote server (e.g., management server 205). In one embodiment, the instance generator 217 may generate an instance (i.e., representation) of the requested restricted content 254 (i.e., the spreadsheet). Likewise, the instance generator 217 may generate discrete aspects of the spreadsheet (e.g., individual cells or groups of cells) in anticipation of requests for those discrete aspects. Additionally, in one embodiment, the instance UI generator 219 may generate various instance UIs relating to the discrete aspects of the spreadsheet. Accordingly, in one example, if a user indicates a desire to zoom into a particular cell or group of cells of the requested spreadsheet, the management agent 310 may query the management server 205 for the pre-generated instance UI relating to the requested cell or groups of cells.

Moving to the sequence diagram shown in FIG. 4, in one embodiment, a client device 110 may receive an indication of a request to access a resource 250 configured for execution by the client device 110. As discussed, the resource 250 may be associated with one or more profiles 256, which may specify various configurations 258 and/or compliance rules 259 applicable to the resource 250, which may be managed by a management agent 310. So, in one embodiment, upon receiving an indication of a request to access a resource 250, at 405, management agent 310 may access and/or query a profile 256 associated with the resource 250 to ensure that the resource 250 operates in accordance with the associated profile 256 (i.e., to determine any limitations associated with the resource 250 and/or to determine one or more processing restrictions or designations associated with the resource 250).

In one embodiment, the profile 256 may specify that that the resource 250 is a restricted resource 250 (and/or restricted application 252 and/or restricted content 254), meaning at least one feature of the resource 250 must be processed outside of the client device 110. For example, in one embodiment, the profile 256 constraining the restricted resource 250 may mandate that at least one aspect or feature of the restricted resource 250 be carried out by a remote server (e.g., management server 205, from which the profile 256 was issued).

Accordingly, in one embodiment, at 410, responsive to determining that the resource 250 is a restricted resource 250 (e.g., responsive to receiving an indication that the processing restriction of the requested resource 250 is "server-only" or "device-server"), the management agent 310 may transmit a request to access the restricted resource 250 (or an aspect of the restricted resource 250) to the management service 210. In one embodiment, at 415, upon receipt of the request, the management service 210 may transmit the request to an instance generator 217. As discussed, in certain embodiments, an instance generator 217 may be configured to generate an instance of the requested resource 250 that can be executed at the management server 205 such that the user of the client device 110 is unaware that she is interacting with an instance of the requested resource 250, as opposed to a locally stored version of the resource 250 being executed at the client device 110. Accordingly, in one embodiment, at 420, the instance generator 217 generates an instance of the requested resource 250. Additionally, in one embodiment, responsive to the generation of the instance of the requested resource 250, at 423, the instance generator 217 may transmit a request to an instance UI generator 219, which may be communicatively coupled to the instance generator 217, to generate an instance UI for engaging the instance of the requested resource 250. Accordingly, at 425, the instance UI generator 219 may generate the instance UI for engaging the instance of the requested resource 250, and the instance UI may be transmitted to the management service, at 430. In one embodiment, at 435, the management service 210 may transmit the instance UI associated with the requested resource 250 to the management agent 310, which the management agent 310 may make available for presentation to the user, at 440.

In one embodiment, upon receiving an indication of a request to interact with an aspect of the resource 250 (i.e., the instance of the resource 250), the management agent 310 may transmit the request to the management service 210, at 445. For instance, a request to interact with an aspect of the resource 250 may include a keystroke, keyword inputs, an input gesture such as a swipe gesture at a touch input device, etc. In one embodiment, at 450, the management service 210 may transmit the request to an instance generator 217 such that it can be processed (at 455) and, at 460, the instance generator 217 may transmit information relating to the processed output to instance UI generator 219 such that instance UI generator 219 can generate an appropriate instance UI reflecting the processed request (i.e., what the user would see in response to the requested manipulation), at 465. In one embodiment, upon processing the request, the instance generator 217 may update any resultant data associated with the request and store the updated data at the management server 205 (e.g., at management database 205).

For example, in one embodiment, the request may be to access a restricted document (i.e., restricted content 254). Accordingly, in one embodiment, the instance UI generator 219 may process the request and render a representation of a UI that presents the requested document to the user. In one example, the restricted resource 250 may be an enterprise contact directory. Accordingly, the management component 310 may receive a request to access a certain subsection of the contacts in the directory (e.g., all contacts having a last name starting with "C"). In the foregoing example, upon receiving the request, the instance generator 217 may process the request (i.e., access the appropriate contacts) and the instance UI generator 219 may render a display of the contacts (i.e., the instance UI) that may be output for presentation to the user.

In one embodiment, at 470, subsequent to rendering the appropriate instance UI, the instance UI generator 219 may transmit the instance UI to management service 210, which may then transmit the instance UI to the management agent 310 for presentation to the user of the client device 110, at 475.

As discussed, a profile 256 associated with a resource 250 may be configured such that only certain aspects of the resource 250 are restricted, while other aspects are unrestricted (i.e., the processing restriction of the resource 250 is "server-device"). Accordingly, upon request by a user to access such a resource 250, the client device 110 may be able to execute aspects of the resource 250 locally (i.e., at the client device 110). But, as noted, the profile 256 may be configured to limit the access to certain aspects of the resource 250 by the client device 110. For example, as discussed above, certain aspects of the resource 250 may contain or be associated with important enterprise information. Accordingly, an administrator may configure a profile 256 such that those aspects (e.g., aspects relating to enterprise information) must be processed outside of the client device 110 (e.g., at the management server 205 from which the profile 256 was issued). In other words, in such an example, the profile 256 associated with the restricted resource 250 requires that certain aspects of the resource 250 must be processed remotely (e.g., at management server 205).

As will be discussed in relation to the sequence diagram shown in FIG. 5, in one embodiment, a client device 110 may receive a request from a user to access a certain resource 250 (e.g., app 252 or content 254). As discussed, one or more profiles 256 may be associated with the requested resource 250. Accordingly, in one embodiment, the management agent 310 may access and/or query a profile 256 associated with the resource 250 to determine whether there are any restrictions or limitations associated with the requested resource 250.

As noted, in one embodiment, the profile 256 may indicate that the resource 250 has been designated as "server-device" (i.e., the processing restriction of the resource 250 is "server-device"), in which case aspects of the resource must be processed or accessed remotely (e.g., at management server 205). Accordingly, in one embodiment of a process 500 as shown in FIG. 5, at 505, responsive to determining that the profile 256 designates the requested resource as server-device, the management agent 310 may transmit a UI for engaging or interacting with the device-side aspects of the requested resource to an aggregate generator 318. Additionally, in one embodiment, at 510, the management agent 310 may transmit a request to a communications module 312 to receive access to server-side aspects of the requested resource 250. As discussed, in one embodiment, a communication module 312 may be configured to establish a communicative connection with the management server 205 and/or management service 210. Accordingly, at 515, upon receipt of the request to access the server-side aspects of the requested resource 250, the communication module 312 may transmit a request for access to the resources to the management service 210 (or management server 205).

In response to receipt of the request, the management server 205 may generate an instance of the requested resource 250 in addition to an instance of the UI for engaging and/or accessing the server-side aspects of the requested resource 250, as described in relation to FIG. 4. Accordingly, in one embodiment, at 520, the management server 205 may transmit the appropriate instance of the UI to the communication module 312. Upon receipt of the instance of the UI, at 525, the communication module 312 may transmit the instance UI to the aggregate generator 318. Further, according to one embodiment, upon receipt of the instance UI for interacting with the server-side aspects of the requested resource 250, at 530, the aggregate generator 318 may fuse the UI for interfacing with client device-side aspects of the resource 250 with the instance of the UI for interfacing with the server-side aspects of the resource 250 to generate a resultant element (i.e., an aggregate UI) for engaging the resource, which is configured for presentation to the user of the client device 110.

In one embodiment, even when a profile 256 designates certain resources 250 as restricted, it may be necessary to transiently store the resource 250 at the client device 110. Accordingly, the management agent 310 may instruct the operating system 330 that the subject information (e.g., the instance of the UI) should be stored at the client device 110 only transiently and should be discarded immediately after use. In one embodiment, the management agent 310 may specify to the operating system 330 one or more storage locations (e.g., a containerized aspect of memory 330) at which the subject information may be transiently stored. Further, the management agent 310 may instruct the operating system 330 that the containerized aspects of the memory 330 transiently storing the subject information should be cleared or overwritten (i.e., the containerized aspects of the memory 330 should be cleared) upon notification that the subject information is no longer necessary, upon expiration of a threshold duration, upon the occurrence of a predefined condition, or upon the occurrence of other applicable criteria.

As described above, FIGS. 4 and 5 illustrate sequence diagrams of example apparatuses, methods, and computer program products according to example embodiments of the invention. It will be understood that each operation of the sequence diagram, and combinations of operations in the sequence diagrams, may be implemented by various means, such as hardware, firmware, processor, circuitry, and/or other devices associated with execution of software including at least one computer program instruction. For example, at least one of the operations described above may be embodied by computer program instructions. According to some example embodiments, such computer program instructions may be embodied as a management agent.

In this regard, the computer program instructions that embody the procedures described above may be stored by a memory device of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function or operation specified in the sequence diagram. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions or operations specified in the sequence diagrams.

Accordingly, operations shown in the sequence diagrams support combinations of means for performing the specified functions and combinations of operations for performing the specified functions. It will also be understood that at least one operation of the sequence diagram, and combinations of operations, can be implemented by special purpose hardware-based computer systems that perform the specified functions, or combinations of special purpose hardware and computer instructions.

Figure 5:
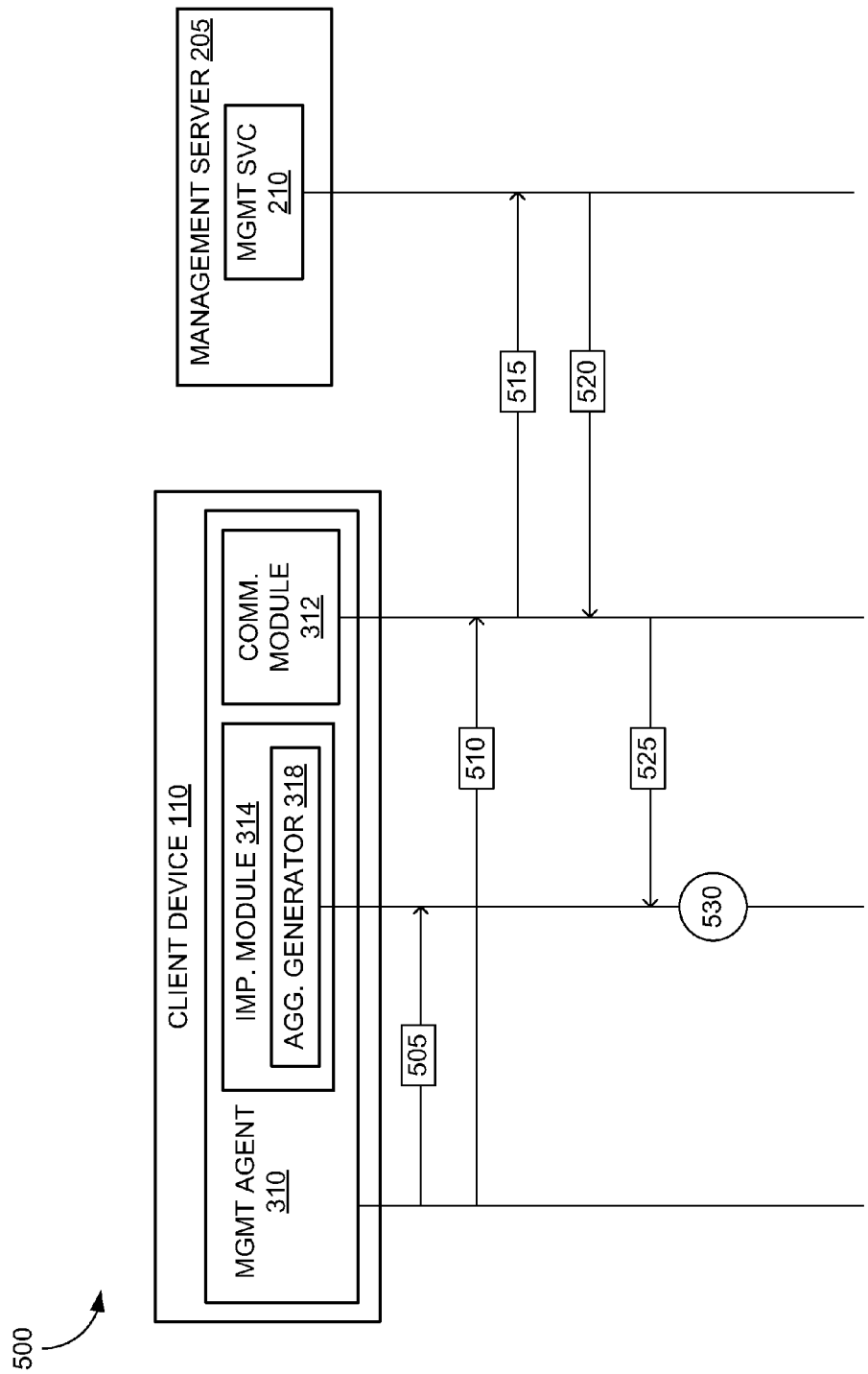
Figure 6:
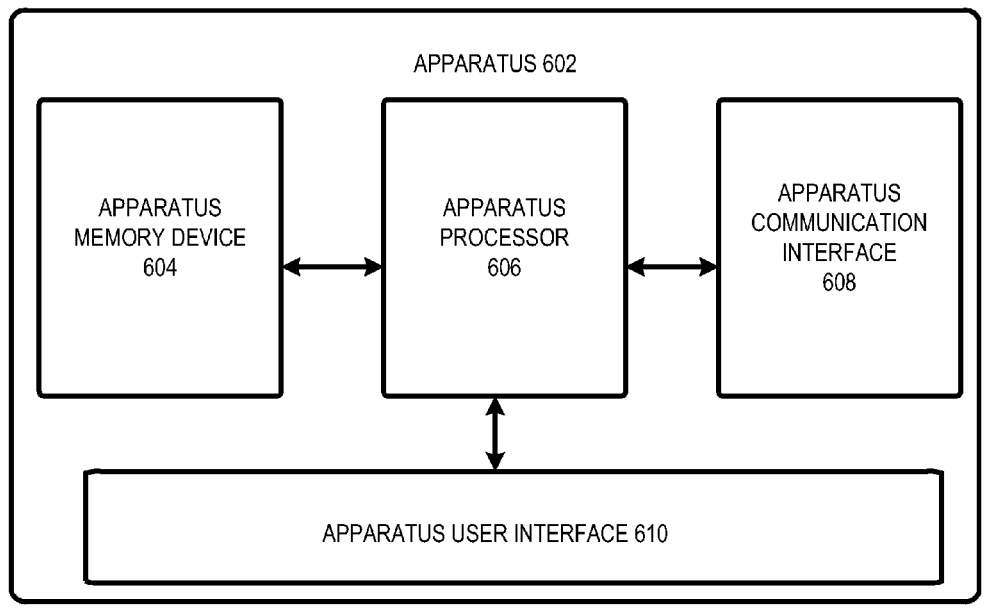
FIG. 6 is a schematic representation of an example apparatus that may be embodied by or otherwise associated with at least one electronic device and which may be configured to implement embodiments of the present invention.

Example embodiments of the invention will now be described with reference to FIG. 6, in which particular elements of an apparatus 602 for implementing various functionality of the example embodiments, including performing the methods depicted in sequence diagrams shown in FIGS. 4 and 5, are depicted. In order to implement such functionality, the apparatus 602 of FIG. 6 may be employed, for example, in conjunction with at least one client device 110 and/or the management server 205 depicted in FIG. 2. But, it should be noted that the apparatus 602 of FIG. 6 also may be employed in connection with a variety of other devices, both mobile and fixed, in order to implement the various functionality of the present invention and therefore, embodiments of the present invention should not be limited to those depicted. It should also be noted that while FIG. 6 illustrates one example of a configuration of an apparatus 602 for implementing the functionality of the present invention, numerous other configurations may additionally or alternatively be used to implement embodiments of the present invention. Accordingly, it will be understood that various devices, components, and/or elements depicted and/or described as being in communication with each other may, for example, be embodied within a single device or distributed across multiple devices.

Referring now to FIG. 6, the apparatus 602 for providing management of restricted actions via unauthorized applications according to some example embodiments of the present invention may include or otherwise be in communication with an apparatus processor 606 ("processor 606"), an apparatus memory device 604 ("memory device 604"), and an apparatus communication interface 608 ("communication interface 608"). As described below, the apparatus 602 may also include an apparatus user interface 610 ("user interface 610"), such as when the apparatus 602 is embodied by or otherwise associated with a client device 110. In some embodiments, the processor 606 (and/or co-processors or other processing circuitry assisting or otherwise associated with the processor 606) may be in communication with the memory device 604 via a bus configured to pass information among components of the apparatus 602. The memory device 604 may, for example, include at least one volatile and/or non-volatile memory. The memory device 604 may be configured to store information, data, content, applications, instructions, or the like, for enabling the apparatus 602 to carry out various functions in accordance with an example embodiment of the present invention. For example, the memory device 604 may be configured to store instructions, such as program code instructions, that, when executed by the processor 606, cause the apparatus 602 to carry out various operations.

The processor 606 may be embodied in a number of different ways. For example, the processor 606 may be embodied as at least one of a variety of hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 606 may include at least one processing core configured to perform independently. A multi-core processor may enable multiprocessing within a single physical package. Additionally or alternatively, the processor 606 may include at least one processor configured in tandem via the bus to enable independent execution of instructions, pipelining and/or multithreading.

In an example embodiment, the processor 606 may be configured to execute instructions stored in the memory device 604 or otherwise accessible to the processor 606. Alternatively or additionally, the processor 606 may be configured to execute hard coded functionality. As such, whether configured by hardware or software methods, or by a combination thereof, the processor 606 may represent an entity (e.g., physically embodied in circuitry) capable of performing operations according to an embodiment of the present invention while configured accordingly. Thus, for example, when the processor 606 is embodied as an ASIC, FPGA or the like, the processor 606 may be specifically configured hardware for conducting the operations described herein. Alternatively, as another example, when the processor 606 is embodied as an executor of software instructions, the instructions may specifically configure the processor 606 to perform the algorithms and/or operations described herein when the instructions are executed. However, in some cases, the processor 606 may be a processor of a specific device (e.g., a client device 110 and/or management server 205) configured to employ an embodiment of the present invention by further configuration of the processor 606 by instructions for performing the algorithms and/or operations described herein. The processor 606 may include, among other things, a clock, an arithmetic logic unit (ALU) and logic gates configured to support operation of the processor 606.

The communication interface 608 may be any means such as a device or circuitry embodied in either hardware or a combination of hardware and software that is configured to receive and/or transmit data from/to a network, such as the network 120, and/or any other device or module in communication with the apparatus 602. In this regard, the communication interface 608 may include, for example, an antenna (or multiple antennas) and supporting hardware and/or software for enabling communications with a wireless communication network. Additionally or alternatively, the communication interface 608 may include the circuitry for interacting with the antenna(s) to cause transmission of signals via the antenna(s) or to handle receipt of signals received via the antenna(s). Additionally or alternatively, the communication interface 608 may include at least one antenna, supporting hardware and/or software, and/or supporting circuitry for receiving and/or transmitting signals according to any short-range communication protocols and/or standards, such as, for example, NFC, Bluetooth, and/or BLE. In some environments, the communication interface 608 may support wired communication. As such, for example, the communication interface 608 may include a communication modem and/or other hardware/software for supporting communication via cable, digital subscriber line (DSL), universal serial bus (USB) or other mechanisms, such as any of those discussed above in the context of the communication ports 350 depicted in FIG. 3.

In some embodiments, such as instances in which the apparatus 602 is embodied by or otherwise associated with a client device 110, the apparatus 602 may include a user interface 610 in communication with the processor 606 to receive indications of user input and/or to cause audible, visual, mechanical or other output to be provided to the user. As such, the user interface 610 may, for example, include a keyboard, a mouse, a joystick, a display, a touch screen, touch areas, soft keys, a microphone, a speaker, a BCI, or other input/output mechanisms and/or devices, such as any of those discussed above in the context of the user interfaces 215 depicted in FIG. 2 and/or the input/output interfaces 360 depicted in FIG. 3. The processor 606 may be configured to control at least one function of at least one user interface element through computer program instructions (e.g., software and/or firmware) stored on a memory accessible to the processor 606 (e.g., memory device 604). In other embodiments, however, the apparatus 602 may not include a user interface 610.

It will be further understood that in embodiments in which the apparatus 602 is embodied by or otherwise associated with a client device 110, the memory device 604 may, for example, be embodied by the memories 302 depicted in FIG. 3; the processor 606 may, for example, be embodied by the processors 340 depicted in FIG. 3; the communication interface 608 may, for example, be embodied by the communication ports 350 depicted in FIG. 3; and/or the user interface 610 may, for example, be embodied by the input/output interfaces 360 depicted in FIG. 3.

Furthermore, embodiments of this disclosure may be practiced in conjunction with a graphics library, other operating systems, or any other application program and is not limited to any particular application or system. The devices described with respect to the FIGS. may have additional features or functionality. For example, client device 110 may also include additional data storage devices (removable and/or non-removable) such as magnetic disks, optical disks, or tape (not depicted).

Many modifications and other embodiments of the embodiments set forth herein will come to mind to one skilled in the art to which these disclosures pertain having the benefit of the teachings presented in the foregoing descriptions and the associated drawings. Therefore, it is to be understood that the disclosures are not to be limited to the specific embodiments and that modifications and other embodiments are intended to be included within the scope of the appended claims. Moreover, although the foregoing descriptions and the associated drawings describe example embodiments in the context of particular example combinations of elements and/or functions, it should be appreciated that different combinations of elements and/or functions may be provided by alternative embodiments without departing from the scope of the appended claims. For example, in some embodiments, particular ones of the operations described above may be modified or enhanced. Furthermore, in some embodiments, additional optional operations may be included. Modifications, additions, or enhancements to the operations above may be performed in any order and in any combination.

Accordingly, different combinations of elements and/or functions than those explicitly described above are also contemplated as may be set forth in some of the appended claims. Although specific terms are employed herein, they are used in a generic and descriptive sense only and not for purposes of limitation.

As defined and used herein, the term "enterprise" may refer to an entity and/or group of individuals, such as a business, institution or an association, that has at least one collective goal, such as financial, social and/or humanitarian goals. Thus, the term "enterprise" may include corporations, governments, non-governmental organizations, international organizations, armed forces, charities, not-for-profit corporations, partnerships, cooperatives, universities, political organizations, mixed public-private organizations, and voluntary associations.

As defined and used herein, the term "IT Department" may refer to a sub-collection of individuals within an "enterprise" that oversees the electronic communications of the "enterprise" in an effort to ensure that data associated with the "enterprise" is protected from unauthorized access. Thus, the "IT Department" may oversee configuring client devices, servers, and/or networks, which may be based at least in part access rights and/or authority of personnel within the "enterprise" utilizing such client devices, servers and/or networks for "enterprise" uses.

As defined and used herein, the term "client device" may refer to any electronic device configured to communicate over at least one network. For example, particular client devices may refer to a mobile telephone, smartphone, tablet computer, PDA, pager, wearable device, projected interface, desktop or laptop computer, a set-top box, a music player, a game console, or any of numerous other fixed or portable communication devices, computation devices, content generation devices, content consumption devices, or combinations thereof As defined herein, a "computer-readable storage medium" may refer to a non-transitory physical storage medium (e.g., volatile or non-volatile memory device), and can be differentiated from a "computer-readable transmission medium," which refers to an electromagnetic signal.

Furthermore, "at least one" and "at least one" both, as used herein, refer to any non-zero quantity and will be used interchangeably herein. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

All rights including copyrights in the code included herein are vested in and the property of the Assignee. The Assignee retains and reserves all rights in the code included herein, and grants permission to reproduce the material only in connection with reproduction of the granted patent and for no other purpose.

All rights including trademarks in the present disclosure are vested in and the property of the owners of the respective trademarks. Accordingly, the Assignee retains and reserves all rights in the trademarks owned by the Assignee, as described herein. Additionally, other third parties may retain and reserve all rights in the trademarks owned by such third-parties, as described herein.

While the specification includes examples, the disclosure's scope is indicated by the following claims. Furthermore, while the specification has been described in language associated with structural features and/or methodological acts, the claims are not limited to the features or acts described above. Rather, the specific features and acts described above are disclosed as example for embodiments of the disclosure.

What is claimed is:

1. A method comprising:
responsive to receiving an indication of a request to access a resource, accessing a profile associated with the resource, wherein the profile comprises at least one profile criterion;
evaluating the at least one profile criterion based at least in part on status information associated with a client device requesting access to the resource to determine whether the requested resource is subject to a processing restriction;
responsive to receiving an indication that the resource is subject to a server-only processing restriction:
requesting access to the resource from a remote server; and
receiving data representative of an instance of a user interface (UI) for interacting with an instance of the requested resource, wherein the instance of the UI is configured for presentation to a user of the client device;
responsive to receiving an indication that the resource is subject to a server-device processing restriction:
outputting data representative of a UI for interacting with device-side aspects of the requested resource to an aggregate generator;
requesting access to server-side aspects of the requested resource from the remote server;

receiving data representative of an instance of a UI for interacting with an instance of the server-side aspects of the requested resource;
outputting data representative of the instance of the UI for interacting with the instance of the server-side aspects of the resource to the aggregate generator; and
generating an aggregate UI, wherein the aggregate UI is configured for presentation to the user of the client device, and wherein the aggregate UI is configured to allow the user to interact with device-side aspects and server-side aspects of the requested resource;
responsive to receiving the indication of the request, determining whether the request is to interact with device-side aspects of the requested resource or server-side aspects of the requested resource;
responsive to determining the request is to interact with device-side aspects of the requested resource:
processing the request;
updating the UI for interacting with device-side aspects of the requested resource based on the processed request;
outputting data representative of an updated UI for interacting with device-side aspects of the requested resource to an aggregate generator; and
generating an updated aggregate UI; and
responsive to determining the request is to interact with server-side aspects of the requested resource:
outputting the request to the remote server;
receiving data representative of an updated instance of a UI for interacting with the instance of server-side aspects of the requested resource;
outputting data representative of the updated instance of the UI for interacting with the instance of server-side aspects of the requested resource to the aggregate generator; and
generating the updated aggregate UI.

2. The method of claim 1, wherein the at least one profile criterion requires the client device to enable at least one configuration.

3. The method of claim 1, wherein the at least one profile criterion requires the client device to utilize at least one credential.

4. The method of claim 1, wherein the at least one profile criterion requires the client device to satisfy at least one compliance rule.

5. The method of claim 1, wherein the at least one profile criterion relates to state details of the client device.

6. The method of claim 1, wherein the at least one profile criterion relates to technological characteristics of the client device.

7. The method of claim 1, wherein the at least one profile criterion relates to contextual characteristics of the client device.

8. A system comprising:
one or more processors;
a memory coupled to the one or more processors and storing instructions that, when executed by the one or more processors, cause the system to:
responsive to receiving an indication of a request to access a resource, access a profile associated with the resource, wherein the profile comprises at least one profile criterion;
evaluate the at least one profile criterion based at least in part on status information associated with a client device requesting access to the resource to determine whether the requested resource is subject to a processing restriction;
responsive to receiving an indication that the resource is subject to a server-only processing restriction:
request access to the resource from a remote server; and
receive an instance of data representative of a user interface (UI) for interacting with an instance of the requested resource, wherein the instance of the UI is configured for presentation to a user of the client device;
responsive to receiving an indication that the resource is subject to a server-device processing restriction:
output data representative of a UI for interacting with device-side aspects of the requested resource to an aggregate generator;
request access to server-side aspects of the requested resource from the remote server;
receive data representative of an instance of a UI for interacting with an instance of the server-side aspects of the requested resource;
output data representative of the instance of the UI for interacting with the instance of the server-side aspects of the resource to the aggregate generator;
generate an aggregate UI, wherein the aggregate UI is configured for presentation to the user of the client device, and wherein the aggregate UI is configured to allow the user to interact with device-side aspects and server-side aspects of the requested resource;
responsive to receiving the indication of the request, determining whether the request is to interact with device-side aspects of the requested resource or server-side aspects of the requested resource;
responsive to determining the request is to interact with device-side aspects of the requested resource:
processing the request;
updating the UI for interacting with device-side aspects of the requested resource based on the processed request;
outputting data representative of an updated UI for interacting with device-side aspects of the requested resource to an aggregate generator; and
generating an updated aggregate UI; and
responsive to determining the request is to interact with server-side aspects of the requested resource:
outputting the request to the remote server;
receiving data representative of an updated instance of a UI for interacting with the instance of server-side aspects of the requested resource;
outputting data representative of the updated instance of the UI for interacting with the instance of server-side aspects of the requested resource to the aggregate generator; and
generating the updated aggregate UI.

9. The system of claim 8, wherein the at least one profile criterion relates to at least one of state details of the client device.

10. The system of claim 8, wherein the at least one profile criterion requires the client device to utilize at least one credential.

11. The system of claim 8, wherein the at least one profile criterion requires the client device to satisfy at least one compliance rule.

12. The system of claim 8, wherein the at least one profile criterion requires the client device to enable at least one configuration.

13. A non-transitory computer-readable medium storing instructions that, when executed by one or more processors, cause a client device to:
- responsive to receiving an indication of a request to access a resource, access a profile associated with the resource, wherein the profile comprises at least one profile criterion;
- evaluate the at least one profile criterion based at least in part on status information associated with the client device to determine whether the requested resource is subject to a processing restriction;
- responsive to receiving an indication that the resource is subject to a server-only processing restriction:
  - request access to the resource from a remote server;
  - receive an instance of data representative of a user interface (UI) for interacting with an instance of the requested resource, wherein the instance of the UI is configured for presentation to a user of the client device;
- responsive to receiving an indication that the resource is subject to a server-device processing restriction:
  - output data representative of a UI for interacting with device-side aspects of the requested resource to an aggregate generator;
  - request access to server-side aspects of the requested resource from the remote server;
  - receive data representative of an instance of a UI for interacting with an instance of the server-side aspects of the requested resource;
  - output data representative of the instance of the UI for interacting with the instance of the server-side aspects of the resource to the aggregate generator;
  - generate an aggregate UI, wherein the aggregate UI is configured for presentation to the user of the client device, and wherein the aggregate UI is configured to allow the user to interact with device-side aspects and server-side aspects of the requested resource;
  - responsive to receiving the indication of the request, determining whether the request is to interact with device-side aspects of the requested resource or server-side aspects of the requested resource;
  - responsive to determining the request is to interact with device-side aspects of the requested resource:
    - processing the request;
    - updating the UI for interacting with device-side aspects of the requested resource based on the processed request;
    - outputting data representative of an updated UI for interacting with device-side aspects of the requested resource to an aggregate generator; and
    - generating an updated aggregate UI; and
  - responsive to determining the request is to interact with server-side aspects of the requested resource:
    - outputting the request to the remote server;
    - receiving data representative of an updated instance of a UI for interacting with the instance of server-side aspects of the requested resource;
    - outputting data representative of the updated instance of the UI for interacting with the instance of server-side aspects of the requested resource to the aggregate generator; and
    - generating the updated aggregate UI.

14. The non-transitory medium of claim 13, wherein the at least one profile criterion relates state details of the client device.

15. The non-transitory medium of claim 13, wherein the at least one profile criterion requires the client device to utilize at least one credential.

16. The non-transitory medium of claim 13, wherein the at least one profile criterion requires the client device to satisfy at least one compliance rule.

17. The system of claim 8, wherein the at least one profile criterion relates to technological characteristics of the client device.

18. The system of claim 8, wherein the at least one profile criterion relates to contextual characteristics of the client device.

19. The non-transitory medium of claim 13, wherein the at least one profile criterion relates to technological characteristics of the client device.

20. The non-transitory medium of claim 13, wherein the at least one profile criterion relates to contextual characteristics of the client device.

* * * * *